United States Patent
Braker et al.

(10) Patent No.: US 10,627,489 B2
(45) Date of Patent: *Apr. 21, 2020

(54) SPATIALLY SELF-SIMILAR PATTERNED ILLUMINATION FOR DEPTH IMAGING

(71) Applicant: COGNEX CORPORATION, Natick, MA (US)

(72) Inventors: Benjamin Braker, Louisville, CO (US); Aaron Wegner, Longmont, CO (US); Ronald Zimmerman, Boulder, CO (US); Eric Moore, Longmont, CO (US); Trevor McDonald, Lafayette, CO (US)

(73) Assignee: Cognex Corporation, Natick, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/377,434

(22) Filed: Apr. 8, 2019

(65) Prior Publication Data

US 2019/0302234 A1    Oct. 3, 2019

Related U.S. Application Data

(60) Continuation of application No. 16/034,485, filed on Jul. 13, 2018, now Pat. No. 10,295,655, which is a (Continued)

(51) Int. Cl.
*G01C 3/08* (2006.01)
*G01S 7/481* (2006.01)
(Continued)

(52) U.S. Cl.
CPC .......... *G01S 7/4814* (2013.01); *G01B 11/002* (2013.01); *G01B 11/2531* (2013.01);
(Continued)

(58) Field of Classification Search
CPC ... G01B 11/2536; G01B 11/245; G01B 11/25; G01C 11/02; G06T 7/0057
(Continued)

(56) References Cited

U.S. PATENT DOCUMENTS 4,687,326 A   8/1987  Corby
4,705,401 A   11/1987 Addleman
(Continued)

FOREIGN PATENT DOCUMENTS

DE   4206836   9/1999
EP   1247070   10/2007
(Continued)

OTHER PUBLICATIONS

Agarwal, A. , N. Agarwal, C. Rajasekhar, and R. Patel, Performance Analysis of 2-D Optical Codes with Cross Correlation Value of One and Two in Optical CDMA System, International Journal of Electrical Engineering & Communication Engineering for Applied Research, vol. 52, No. 1, Jan.-Jun. 2012, pp. 21-29.
(Continued)

*Primary Examiner* — Md M Rahman

(57) ABSTRACT

Methods, systems, and devices involving patterned radiation are provided in accordance with various embodiments. Some embodiments include a device for projecting pattern radiation. Some embodiments include a method for estimating coordinates of a location on an object in a 3D scene. Some embodiments include a system for estimating the coordinates of a location on an object in a 3D scene. A variety of radiation patterns are provided in accordance with various embodiments. Some embodiments may relate to the use of patterned illumination to identify the angular information that may be utilized to measure depth by triangulation.

18 Claims, 17 Drawing Sheets

Related U.S. Application Data division of application No. 15/389,804, filed on Dec. 23, 2016, now Pat. No. 10,088,556, which is a continuation of application No. 14/643,966, filed on Mar. 10, 2015, now Pat. No. 9,562,760.

(60) Provisional application No. 61/950,219, filed on Mar. 10, 2014.

(51) Int. Cl.
  *G01B 11/00* (2006.01)
  *G01B 11/25* (2006.01)
  *G06T 7/521* (2017.01)
  *G01S 17/42* (2006.01)

(52) U.S. Cl.
  CPC .............. *G01S 17/42* (2013.01); *G06T 7/521* (2017.01); *G06T 2207/20056* (2013.01)

(58) Field of Classification Search
  USPC ........................................................ 356/4.03
  See application file for complete search history.

(56) References Cited

U.S. PATENT DOCUMENTS

| | | | |
|---|---|---|---|
| 5,825,933 A | 10/1998 | Hecht | |
| 6,052,189 A * | 4/2000 | Fuse | G01B 11/0608 356/615 |
| 6,057,892 A | 5/2000 | Borer | |
| 6,076,738 A | 6/2000 | Bloomberg | |
| 6,341,016 B1 | 1/2002 | Malione | |
| 6,441,888 B1 | 8/2002 | Azuma | |
| 6,621,578 B1 * | 9/2003 | Mizoguchi | G01B 11/065 356/369 |
| 6,751,344 B1 | 6/2004 | Grumbine | |
| 6,754,370 B1 | 6/2004 | Hall-Holt | |
| 7,002,699 B2 | 2/2006 | Kong | |
| 7,013,040 B2 | 3/2006 | Shiratani | |
| 7,103,212 B2 | 9/2006 | Hager | |
| 7,164,789 B2 | 1/2007 | Chen | |
| 7,433,024 B2 | 10/2008 | Garcia | |
| 7,768,656 B2 | 8/2010 | Lapa | |
| 7,804,997 B2 | 9/2010 | Geng | |
| 8,050,461 B2 | 11/2011 | Shpunt | |
| 8,090,194 B2 | 1/2012 | Golrdon | |
| 8,150,142 B2 | 4/2012 | Freedman | |
| 8,208,719 B2 | 6/2012 | Gordon | |
| 8,350,847 B2 | 1/2013 | Shpunt | |
| 8,384,997 B2 | 2/2013 | Shpunt | |
| 8,531,650 B2 | 9/2013 | Feldkhun | |
| 8,538,166 B2 | 9/2013 | Gordon | |
| 8,717,417 B2 | 5/2014 | Sali | |
| 8,749,796 B2 | 6/2014 | Pesach | |
| 8,786,682 B2 | 7/2014 | Shpunt | |
| 8,836,921 B2 | 9/2014 | Feldkhun | |
| 8,908,277 B2 | 12/2014 | Pesach | |
| 8,982,182 B2 | 3/2015 | Shpunt | |
| 9,066,087 B2 | 6/2015 | Shpunt | |
| 9,562,760 B2 | 2/2017 | Braker | |
| 9,696,137 B2 | 7/2017 | Braker | |
| 10,317,193 B2 | 6/2019 | Braker | |
| 2003/0127593 A1 * | 7/2003 | Shinada | H01J 37/29 250/310 |
| 2004/0233437 A1 * | 11/2004 | Horie | G01N 21/211 356/369 |
| 2005/0073323 A1 * | 4/2005 | Kohno | G01R 27/2605 324/662 |
| 2006/0088139 A1 * | 4/2006 | Nakano | G01N 23/20016 378/79 |
| 2006/0192925 A1 | 8/2006 | Chang | |
| 2007/0046924 A1 | 3/2007 | Chang | |
| 2007/0109527 A1 | 5/2007 | Wenstrand | |
| 2007/0115484 A1 | 5/2007 | Huang | |
| 2007/0177160 A1 | 8/2007 | Sasaki | |
| 2007/0268398 A1 | 11/2007 | Raskar | |
| 2008/0049222 A1 * | 2/2008 | Yamaguchi | G01B 11/0625 356/328 |
| 2008/0118143 A1 | 5/2008 | Gordon | |
| 2009/0009741 A1 * | 1/2009 | Okita | G03F 7/70516 355/53 |
| 2009/0059236 A1 * | 3/2009 | Meeks | G01B 11/065 356/445 |
| 2009/0246655 A1 * | 10/2009 | Touya | B82Y 10/00 430/30 |
| 2010/0020078 A1 | 1/2010 | Shpunt | |
| 2010/0201811 A1 | 8/2010 | Garcia | |
| 2010/0225746 A1 | 9/2010 | Shpunt | |
| 2012/0032077 A1 * | 2/2012 | Matsumoto | G01B 15/04 250/307 |
| 2012/0063672 A1 | 3/2012 | Gordon | |
| 2013/0048494 A1 * | 2/2013 | Kikuchi | C23C 14/081 204/298.13 |
| 2013/0108104 A1 | 5/2013 | Sonoda | |
| 2013/0250066 A1 | 9/2013 | Abraham | |
| 2014/0022348 A1 | 1/2014 | Shpunt | |
| 2014/0076500 A1 * | 3/2014 | Honda | H01L 21/67092 156/750 |
| 2014/0150981 A1 * | 6/2014 | Itou | B32B 38/1858 156/714 |
| 2015/0116687 A1 * | 4/2015 | Yoneda | G03F 7/70775 355/72 |
| 2015/0253123 A1 * | 9/2015 | Braker | G01B 11/002 356/610 |
| 2015/0292866 A1 * | 10/2015 | Sasaki | G01B 11/0641 356/369 |
| 2017/0048507 A1 | 2/2017 | Campbell | |
| 2017/0205495 A1 | 7/2017 | Braker | |
| 2018/0045503 A1 | 2/2018 | Braker | |
| 2019/0139242 A1 | 5/2019 | Liu | |
| 2019/0353472 A1 | 11/2019 | Braker | |

FOREIGN PATENT DOCUMENTS

| | | |
|---|---|---|
| WO | WO2007043036 | 4/2007 |
| WO | WO2010006081 | 1/2010 |
| WO | WO2013076583 | 5/2013 |
| WO | WO2016153680 | 9/2016 |

OTHER PUBLICATIONS

Anna, Tulsi, et al., "Sinusoidal Fringe Projection System Based on Compact and Non-Mechanical Scanning Low-Coherence Michelson Interferometer for Three-Dimensional Shape Measurement," Optics Communications 282; 1237-1242, 2008.11.080.

Chang, Ming, et al., "High Speed Three-Dimensional Profilometry Utilizing Laser Diode Arrays," Optical Engineering, vol. 42 No. 12, pp. 3595-3599 (Dec. 2003).

Chen, Frank, et al., "Overview of Three-Dimensional Shape Measurement Using Optical Methods," Optical Engineering, vol. 39, No. 1, pp. 10-22 (Jan. 2000).

Coggrave, C. R., "High-speed Surface Profilometer Based on a Spatial Light Modulator and Pipeline Image Processor," Optical Engineering, vol. 38, No. 9, pp. 1573-1581 (Sep. 1999).

Geng, Jason, "Structured-light 3D surface Imaging: a Tutorial," Advances in Optics and Photonics vol. 3, 128-160 (2011).

Gorthi, Sai Siva, et al., "Fringe Projection Techniques: Whither we are?" Optics and Lasers in Engineering vol. 48, No. 2:133-140, 2010.

Guan, Chun, Laurence G. Hassebrook, Daniel L. Lau, Veeraganesh Yalla, "Near-infrared composite pattern projection for continuous motion hand-computer interaction," Journal of Visual Communication and Image Representation, vol. 18, Issue 2, Apr. 2007, pp. 141-150, ISSN 1047-3203, http://dx.doi.org/10.1016/j.ivcir.2006.11.006.

Guo, Hongwei, Mingyi Chen, and Peng Zheng, "Least-squares fitting of carrier phase distribution by using a rational function in fringe projection profilometry: erratum," Opt. Lett. 32, 487-487 (2007).

(56) References Cited

OTHER PUBLICATIONS

Handley, John C., Edward R. Dougherty, Maximum-Likelihood Estimation for the Two-Dimensional Discrete Boolean Random Set and Function Models Using Multidimensional Linear Samples, Graphical Models and Image Processing, vol. 59, Issue 4, Jul. 1997, pp. 221-231, ISSN 1077-3169, http://dx.doi.org/10.1006/gmip.1997.0432.

Harding, Kevin, "Challenges and opportunities for 3D optical metrology: what is needed today from an industry perspective," Proc. SPIE 7066, Two- and Three-Dimensional Methods for Inspection and Metrology VI, 70660F (Aug. 29, 2008).

Huang, Peisen S., et al. "Color-Encoded Digital Fringe Projection Technique for High-Speed three-dimensional Surface Contouring," Optical Engineering vol. 38 No. 6, pp. 1065-1071 (Jun. 1999).

Huang, Peisen S., et al., "High-Speed 3-D Shape Measurement based on Digital Fringe Projection," Optical Engineering vol. 42, No. 1, pp. 163-168 (Jan. 2003).

Huntley, J.M., et al., "Shape Measurement by Temporal Phase Unwrapping and Spatial Light Modulator-based Fringe Projector," SPIE vol. 3100; Sep. 25, 1997; 0277-786X.

Kazovsky, L. G., "Beam position estimation by means of detector arrays," Optical and Quantum Electronics, vol. 13, p. 201-208. (May 1981).

Kinell, Lars, "Multichannel Method for Absolute Shape Measurement Using Projected Fringes," Optics and Lasers in Engineering vol. 41 (2004) pp. 57-71.

Li, E. B., et al., "Multi-Frequency and Multiple Phase-Shift Sinusoidal Fringe Projection for 3D Profilometry," Optics Express vol. 13, No. 5, pp. 1561-1569; Mar. 7, 2005.

Liu, Kai, "Dual-Frequency Pattern Scheme for High-Speed 3-D Shape Measurement," Optics Express, vol. 18, No. 5, pp. 5229-5244, Mar. 1, 2010.

Mermelstein, Michael S., et al., "Video-rate Surface Profiling with Acousto-Optic Accordion Fringe interferometry," Optical Engineering vol. 39, No. 1, pp. 106-113, Jan. 2000.

Pan, Jiahul, et al., "Color Phase-Shifting Technique for three-Dimensional Shape Measurement," Optical Engineering vol. 45, No. 1, 013602, Jan. 2006.

Peng, Xiang, et al., "Three-Dimensional Vision with Dual Acousto-optic Deflection Encoding," Optics Letters, vol. 30, No. 15, pp. 1965-1967, Aug. 1, 2005.

Sainov, Ventseslav, et al., "Real Time Phase Stepping Pattern Projection Profilometry," Proc. of SPIE, vol. 6341, Sep. 15, 2006.

Salvi, Joaquim, et al., "Pattern Codification Strategies in Structured Light Systems," Pattern Recognition the Journal of the Pattern Recognition Society, vol. 37 (2004), pp. 827-849.

Schirripa-Spagnolo, Giuseppe and Dario Ambrosini, "Surface contouring by diffractive optical element-based fringe projection," Measurement Science and Technology 12, N6 (2001).

Skydan, Oleksandr, et al., "Technique for Phase Measurement and Surface Reconstruction by Use of Colored Structured Light," Applied Optics, vol. 41, No. 29, Oct. 10, 2002.

Stoykova, Elena, et al., "Pattern Projection with a Sinusoidal Phase Grating," Hindawi Publishing Corporation EURASIP Journal on Advances in Signal Processing, vol. 2009, article ID 351626, 10 pages, May 13, 2008.

Su, Wei-Hung, Cho-Yo Kuo, Chun-Chieh Wang, and Chung-Fan Tu, "Projected fringe profilometry with multiple measurements to form an entire shape," Opt. Express 16, 4069-4077 (2008).

Wang, Yongchang, et al., "Maximum SNR Pattern Strategy for Phase Shifting Methods in Structured light Ilumination," Journal Optical Society of America, vol. 27, No. 9, pp. 1962-1971, Sep. 2010.

Wyant, J. "Computerized interferometric surface measurements [Invited]," Appl. Opt. 52, 1-8 (2013).

Yin, Xuebing, et al., "Acoustic Grating Fringe Projector for High-Speed and High-Precision three-Dimensional Shape Measurements," Applied Optics, vol. 46, No. 15, pp. 3046-3051, May 20, 2007.

Zhang, Song, "Recent progresses on Real-Time 3D Shape Measurement Using Digital Fringe Projection Techniques," Journal Optics and Lasers in Engineering, Elsevier, 0143-8166, Mar. 8, 2009.

International Search Report, PCT/US2009/049978, dated Jan. 17, 2010, EPO.

Written Opinion, PCT/US2009/049978, dated Jan. 8, 2011, EPO.

1st Office Action, German Appl. No. 112009001652.9, dated Jul. 23, 2017, German Patent Office.

Non-Final Office Action, U.S. Appl. No. 12/499,758, dated Nov. 29, 2012, USPTO.

Notice of Allowance, U.S. Appl. No. 12/499,758, dated May 7, 2013, USPTO.

Non-Final Office Action, U.S. Appl. No. 13/961,397, dated Oct. 29, 2013, USPTO.

Notice of Allowance, U.S. Appl. No. 13/961,397, dated May 8, 2014, USPTO.

Non-Final Office Action, U.S. Appl. No. 14/455,039, dated Sep. 21, 2016, USPTO.

Notice of Allowance, U.S. Appl. No. 14/455,039, dated Feb. 28, 2017, USPTO.

Notice of Allowance, U.S. Appl. No. 14/643,966, dated Sep. 23, 2016, USPTO.

Restriction Requirement, U.S. Appl. No. 15/389,804, dated Jun. 22, 2017, USPTO.

Non-Final Office Action, U.S. Appl. No. 15/389,804, dated Oct. 16, 2017, USPTO.

Notice of Allowance, U.S. Appl. No. 15/389,804, dated Apr. 13, 2018, USPTO.

Non-Final Office Action, U.S. Appl. No. 15/607,602, dated Sep. 11, 2018, USPTO.

Notice of Allowance, U.S. Appl. No. 15/607,602, dated Mar. 7, 2019, USPTO.

Non-Final Office Action, U.S. Appl. No. 16/104,106, dated Sep. 3, 2019, USPTO.

European Search Report and Search Opinion, European Appl. No. 18189419.7, dated Nov. 29, 2018, EPO.

* cited by examiner

SPATIALLY SELF-SIMILAR PATTERNED ILLUMINATION FOR DEPTH IMAGING

CROSS-REFERENCES TO RELATED APPLICATIONS

This application is a continuation of U.S. non-provisional patent application Ser. No. 16/034,485, filed on Jul. 13, 2018 and entitled "SPATIALLY SELF-SIMILAR PATTERNED ILLUMINATION FOR DEPTH IMAGING," now U.S. Pat. No. 10,295,655, which is a division of U.S. non-provisional patent application Ser. No. 15/389,804, filed on Dec. 23, 2016 and entitled "SPATIALLY SELF-SIMILAR PATTERNED ILLUMINATION FOR DEPTH IMAGING," now U.S. Pat. No. 10,088,556, which is a continuation of U.S. non-provisional patent application Ser. No. 14/643,966, filed on Mar. 10, 2015 and entitled "SPATIALLY SELF-SIMILAR PATTERNED ILLUMINATION FOR DEPTH IMAGING," now U.S. Pat. No. 9,562,760, which is a non-provisional patent application claiming priority benefit of U.S. provisional patent application Ser. No. 61/950,219, filed on Mar. 10, 2014 and entitled "OVERLAID PATTERNS OF 2D SUB-ARRAYS FOR STRUCTURED ILLUMINATION 3D MEASUREMENTS," the entire disclosure of which is herein incorporated by reference for all purposes.

BACKGROUND

Different embodiments relate in general to devices, systems, and methods for determining the three-dimensional coordinates of one or more locations on the surface of an object.

The capability to measure the coordinate of, or the distance to, points on the surface of an object is generally useful for many applications. Three-dimensional imaging of objects is generally widely used for applications including quality assurance, automation, as-built documentation, reverse engineering, machine vision, gesture recognition, and robotic navigation, for example. While some coordinate measurement applications allow for physical contact with the object under test, many applications may involve measurements to be performed without making physical contact. For such applications, a variety of optical methods have generally been developed for non-contact depth sensing and coordinate measurement.

Broadly, optical methods for distance measurement and coordinate estimation may generally be divided into two categories: monostatic methods, which may measure distance out and back along a single optical propagation path, and triangulation methods, which may utilize the principle of triangulation to obtain distance information.

Generally speaking, distance measurement via triangulation may involve identifying the direction to the point being measurement, specified as an angle, from two fixed points separated by a known distance. This approach may be applied in an imaging configuration using the method of stereo vision, whereby images of an object or scene may be acquired from two points of view. If the cameras may be calibrated such that location within the images may be mapped to angle through the knowledge of the camera, quantitative depth data may be calculated for points within the images that can be identified as correspondences. Correspondences may be points that correspond to the same physical object point within both images, and may include singular points, such as corners, or other identifiable features such as irregular surface texture. For many types of objects and scenes, identifying correspondences may be a significant problem, due to the fact that featureless regions often exist. While methods have generally been developed to propagate depth measurement at correspondences into featureless regions with a level of confidence, the correspondence problem nevertheless may restrict the usefulness of quantitative stereo vision.

A number of active triangulation methods generally have been introduced, whereby one camera in an archetypal stereo vision system may be replaced by a projector of patterned illumination. The illumination pattern may be structured to contain angular information from the perspective of the projector, thus when coupled with a calibrated camera, two angles for triangulation may be acquired. The simplest form of angle-encoded pattern projection may be to project light at only a single angle at a time. This approach may be the basis for depth measurements by laser line scanning. To produce a three-dimensional measurement of a surface scene, a line scanning system may involve a relative motion between the measurement device and the surface. An alternative approach to depth imaging of surfaces may be to utilize wide-field structured light, whereby the patterned illumination may be spread over an extended area. Wide-field methods may be faster than line or point scanning techniques and many may operate without any moving parts.

Many different angle-encoding schemes for wide-field structured illumination have generally been proposed. Some methods may utilize a sequence of patterns, whereby the sequence of optical intensities projected at each angle uniquely may encode the identity of the angle. Examples of such multi-pattern approaches may include temporal phase unwrapping and/or temporal Gray code methods. While multi-pattern methods may produce very accurate and/or high-resolution depth images, the need to project multiple patterns in sequence may mean they are slow and may not generally be suitable for applications that involve measurements of moving objects.

Rapid acquisition of depth images may be enabled by single-pattern structured illumination methods. Single-pattern methods may utilize direct codification, where each angle may be identified by a unique value, or angular information may be encoded within contiguous regions of the pattern, often referred to as spatial neighborhoods. Direct codification, where each angle may be mapped to, for example, a unique intensity or color, may in principal produce high resolution depth images. Direct codification strategies may fail, however, due to variations in reflectivity or coloration of the object under test, which may cause decoding errors. Spatial neighborhood methods may use patterns that vary in one or two dimensions, and may encode angular information using spatial variation of pattern intensity within a region surrounding or adjacent to the angle being encoded. Color method may have a disadvantage in that they are generally limited to neutrally colored objects, as object coloration may interfere with the decoding process. In order to uniquely identify as many angles as possible within the projected pattern, pattern designs may often focus on optimizing the number of unique angles that may be encoded.

There may thus be a need for tools and techniques that may address one or more of these problems and/or for determining the three-dimensional coordinates of one or more locations on the surface of an object.

BRIEF SUMMARY

Methods, systems, and devices involving patterned radiation are provided in accordance with various embodiments.

Some embodiments include a device for projecting pattern radiation. Some embodiments include a method for estimating coordinates of a location on an object in a 3D scene. Some embodiments include a system for estimating the coordinates of a location on an object in a 3D scene. A variety of radiation patterns are provided in accordance with various embodiments. Some embodiments may relate to the use of patterned illumination to identify the angular information that may be utilized to measure depth by triangulation.

For example, some embodiments include a device for projecting patterned radiation. The device may include a pattern-generating element configured to produce a radiation pattern. The radiation pattern may include multiple spatial symbols. Each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols. In some embodiments, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

Some embodiments of the device may include a radiation source. The radiation source may include a laser diode, an array of vertical-cavity surface-emitting lasers, a light-emitting diode, or a lamp.

In some embodiments of the device, the at least one characteristic of the radiation distribution includes an amplitude of the radiation distribution. In some embodiments of the device, at least one characteristic of the radiation distribution includes at least a frequency, a phase, or a polarization of the radiation distribution.

In some embodiments of the device, the multiple spatial symbols are further configured such that: a normalized spatial cross correlation between the master spatial symbol and the multiple spatial symbols arranged in a spatial arrangement, having a domain of relative offsets between the master spatial symbol and the arrangement of spatial symbols, is calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a third predetermined threshold; and/or the normalized spatial cross correlation values are less than a fourth predetermined threshold at all regions of the domain other than the peaks. In some embodiments, each respective spatial symbol of the multiple spatial symbols may be further configured to be similar to a master spatial symbol such that: a peak of a normalized spatial cross correlation of the master spatial symbol and each respective spatial symbol exceeds a third predetermined threshold; and/or each side lobe, from multiple side lobes, of the normalized spatial cross correlation of the master spatial symbol and each respective spatial symbol is less than a fourth predetermined threshold.

In some embodiments of the device, the pattern-generating element includes at least a mask, a diffractive optical element, or a hologram. In some embodiments, the multiple spatial symbols includes spatially modulated copies of an amplitude of the master spatial symbol. In some embodiments, the multiple spatial symbols includes spatially modulated copies of at least a frequency, a phase, or a polarization of the master spatial symbol.

In some embodiments of the device, the master spatial symbol includes multiple discrete pattern elements. The multiple spatial symbols may be produced by modulating at least an amplitude, a frequency, a phase, a position, a size, or a polarization of one or more of the discrete pattern elements comprised by the master spatial symbol in some cases. At least one of the discrete pattern elements may be absent from at least one of the multiple spatial symbols in some cases. In some embodiments, at least one of the multiple spatial symbols includes one or more discrete pattern elements that are absent in the master spatial symbol.

In some embodiments of the device, the multiple spatial symbols are two-dimensional radiation distributions. In some embodiments, the one or more of the multiple spatial symbols is repeated within the radiation pattern.

Some embodiments include a method of estimating coordinates of a location on an object in a 3D scene. The method may include illuminating at least a portion of the 3D scene with a radiation pattern. The radiation pattern may include multiple spatial symbols. Each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols. In some embodiments, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

The method may include detecting the radiation pattern illuminating at least the portion of the illuminated 3D scene using one or more radiation detectors. The method may include estimating the coordinates of the location on the object based on the detected radiation pattern.

In some embodiments, the detected radiation pattern forms an image of the 3D scene. In some embodiments, the one or more radiation detectors include at least a CMOS or a CCD detector array.

In some embodiments, estimating the coordinates of the location on the object based on the formed image of the 3D scene includes: detecting one or more spatial symbols from the multiple spatial symbols within the formed image of the 3D scene; locating the one or more detected spatial symbols within the formed image of the 3D scene; and/or identifying one or more of the detected spatial symbols. Some embodiments may further include identifying one or more pattern elements within the identified spatial symbols. In some embodiments, estimating the coordinates of the location on the object utilizes a location of the one or more identified pattern elements within the formed image.

In some embodiments, detecting the one or more spatial symbols includes comparing two or more regions within the formed image to the master spatial symbol. Comparing the two or more regions may include using a cross correlation operation. Some embodiments may further include identifying one or more pattern elements within the identified spatial symbols based on a location of the one or more pattern elements within the identified spatial symbol.

In some embodiments, the radiation pattern further includes one or more additional spatial symbols. In some embodiments, one or more of the multiple spatial symbols is repeated within the radiation pattern.

In some embodiments, the multiple spatial symbols are further configured such that: a normalized spatial cross correlation between the master spatial symbol and the multiple spatial symbols arranged in a spatial arrangement, having a domain of relative offsets between the master spatial symbol and the arrangement of spatial symbols, is calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a third predetermined threshold; and/or the normalized spatial cross correlation values are less than a fourth predetermined threshold at all regions of the domain other than the peaks. In some embodiments, each respective spatial symbol of the multiple spatial symbols may be further configured to be similar to a master spatial symbol such that: a peak of a normalized spatial cross correlation of the master spatial symbol and each respective spatial symbol exceeds a third predetermined threshold; and/or each side lobe, from multiple side lobes, of the normalized spatial cross correlation of the master spatial symbol and each respective spatial symbol is less than a forth predetermined threshold.

Some embodiments include a system for estimating the coordinates of a location on an object in a 3D scene. The system may include a device for projecting patterned radiation. The device may include a radiation source. The device may include a pattern-generating element configured to produce a radiation pattern. The radiation pattern may include multiple spatial symbols. Each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols.

In some embodiments, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

The system may include one or more detector elements configured to detect the radiation pattern illuminating at least a portion of the 3D scene. The system may include one or more processors configured to estimate the coordinates of the location on the object in the 3D scene based on the detected radiation pattern.

In some embodiments, the radiation source includes at least a laser diode, an array of vertical-cavity surface-emitting lasers, a light-emitting diode, or a lamp. In some embodiments, the pattern-generating element includes at least a mask, a diffractive optical element, or a hologram.

In some embodiments, at least one of the device for projecting patterned radiation, the one or more detector elements, or the one or more processors are embedded within a mobile electronic device. In some embodiments, at least one of the device for projecting patterned radiation, the one or more detector elements, or the one or more processors are operated remotely.

Some embodiments include a radiation pattern. The radiation pattern may include multiple spatial symbols. Each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols. In some embodiments, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

Some embodiments include methods, systems, and/or devices as described in the detailed description and/or shown in the figures.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
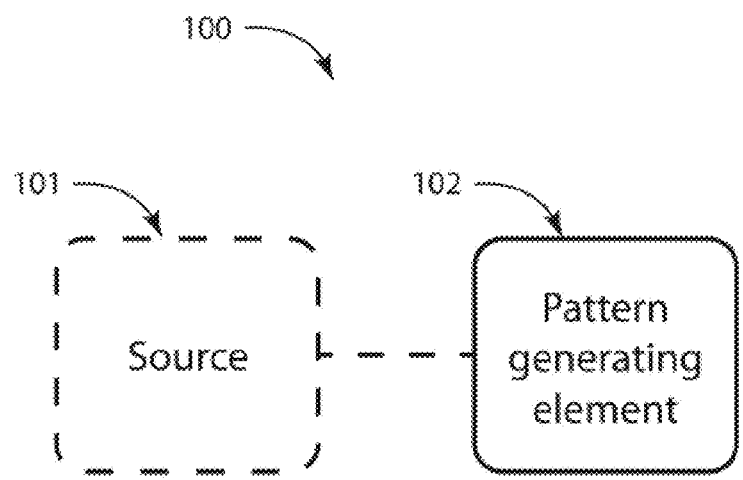
FIG. 1A and FIG. 1B show block diagrams of various embodiments of a pattern projection device.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment, as other embodiments may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which may be depicted as a flowchart, a flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Methods, systems, and devices involving patterned radiation are provided in accordance with various embodiments. Some embodiments include a device for projecting pattern radiation. Some embodiments include a method for estimating coordinates of a location on an object in a 3D scene. Some embodiments include a system for estimating the coordinates of a location on an object in a 3D scene. A variety of radiation patterns are provided in accordance with various embodiments. Some embodiments may relate to the use of patterned illumination to identify the angular information that may be utilized to measure depth by triangulation.

Figure 1B:
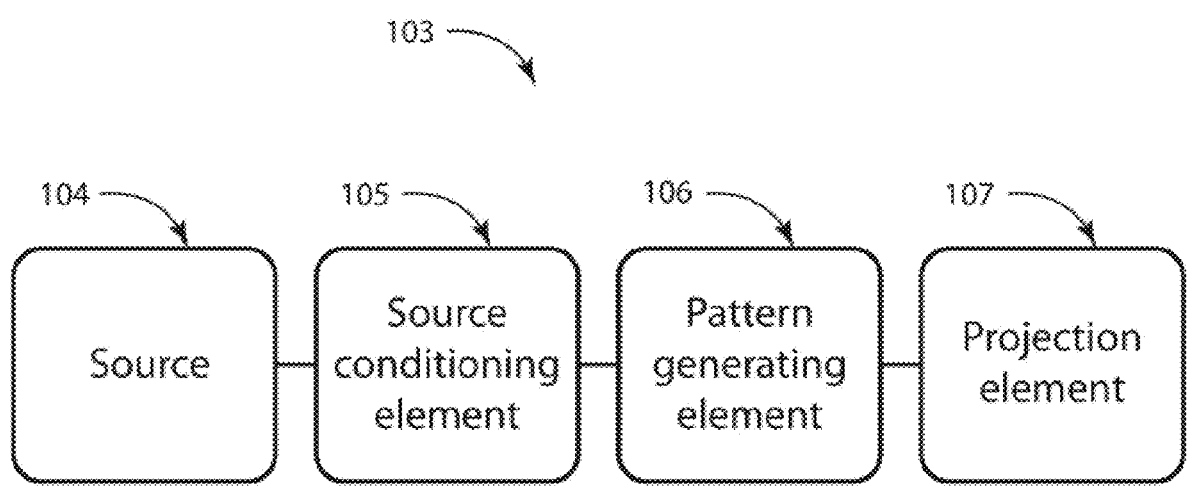

Turning now to FIG. 1A and FIG. 1B, various systems and/or devices in accordance to various embodiments are provided. Some embodiments may include a device 100 for projecting patterned radiation as shown in FIG. 1A. The radiation pattern may include multiple spatial symbols, where each spatial symbol includes a radiation distribution such that at least one characteristic of the radiation distribution varies spatially. Furthermore, the multiple spatial symbols may be configured such that each respective spatial symbol of the multiple spatial symbols may be distinguishable from the other spatial symbols of the multiple spatial symbols, and each respective spatial symbol of the multiple spatial symbols may be similar to a master spatial symbol.

According to some embodiments illustrated in FIG. 1A, the device 100 for projecting patterned radiation may include a pattern generating element 101. Additionally, the device 100 may include a source of radiation 102. In some embodiments, the source 102 may be integrated with the pattern generating element 101, or the source 102 itself may generate the radiation pattern directly. In another embodiment, shown in FIG. 1B, a device 103 for projecting patterned radiation may include a source of radiation 104, one or more elements 105 for conditioning the radiation, one or more pattern generating elements 106, and/or one or more projection elements 107. The source conditioning element 105 may collect, collimate, focus, shape, split, amplify, redirect, redistribute, and/or otherwise condition the radiation of the radiation emitted by the source 104. While the pattern generating element 106 may emit a radiation pattern directly, in some embodiments one or more projection elements 107 may be used to relay, magnify, distort, reshape, focus, and/or otherwise project the radiation pattern. In some embodiments, the output of the pattern generating element 106 may require modification by one or more additional elements to produce the desired radiation pattern. Note that other embodiments may exclude one or more elements shown in the device 103, while other embodiments may include additional elements. In some embodiments, the radiation pattern may be projected onto an object or scene, for example. Pattern generating element 106 may be an example of pattern generating element 102; source 104 may be an example of source 101.

In general, device 100 and/or 103 may be configured for projecting patterned radiation. The device 100 and/or 103 may include a pattern-generating element 102 and/or 106, respectively, as noted above, which may be configured to produce a radiation pattern. The radiation pattern may include multiple spatial symbols. In some embodiments, each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols. In some embodiments, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

Some embodiments of device 100 and/or 103 may include a radiation source, such as source 101 and/or 104, as noted above. The radiation source 101 and/or 104 may include a laser diode, an array of vertical-cavity surface-emitting lasers, a light-emitting diode, or a lamp.

In some embodiments of the device 100 and/or 103, the at least one characteristic of the radiation distribution includes an amplitude of the radiation distribution. In some embodiments of the device 100 and/or 103, at least one characteristic of the radiation distribution includes at least a frequency, a phase, or a polarization of the radiation distribution.

In some embodiments of the device 100 and/or 103, the multiple spatial symbols are further configured such that: a normalized spatial cross correlation between the master spatial symbol and the multiple spatial symbols arranged in a spatial arrangement, having a domain of relative offsets between the master spatial symbol and the arrangement of spatial symbols, is calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a third predetermined threshold; and/or the normalized spatial cross correlation values are less than a fourth predetermined threshold at all regions of the domain other than the peaks. In some embodiments, each respective spatial symbol of the multiple spatial symbols may be further configured to be similar to a master spatial symbol such that: a peak of a normalized spatial cross correlation of the master spatial symbol and each respective spatial symbol exceeds a third predetermined threshold; and/or each side lobe, from multiple side lobes, of the normalized spatial cross correlation of the master spatial symbol and each respective spatial symbol is less than a fourth predetermined threshold.

In some embodiments of device 100 and/or 103, the pattern-generating element 102 and/or 106 includes at least a mask, a diffractive optical element, or a hologram. In some embodiments of device 100 and/or 103, the multiple spatial symbols includes spatially modulated copies of an amplitude of the master spatial symbol. In some embodiments, the multiple spatial symbols includes spatially modulated copies of at least a frequency, a phase, or a polarization of the master spatial symbol.

In some embodiments of device 100 and/or 103, the master spatial symbol includes multiple discrete pattern elements. The multiple spatial symbols may be produced by modulating at least an amplitude, a frequency, a phase, a position, a size, or a polarization of one or more of the discrete pattern elements comprised by the master spatial symbol in some cases. At least one of the discrete pattern elements may be absent from at least one of the multiple spatial symbols in some cases. In some embodiments, at least one of the multiple spatial symbols includes one or more discrete pattern elements that are absent in the master spatial symbol.

In some embodiments of device 100 and/or 103, the multiple spatial symbols are two-dimensional radiation distributions. In some embodiments, the one or more of the multiple spatial symbols is repeated within the radiation pattern.

Figure 2:
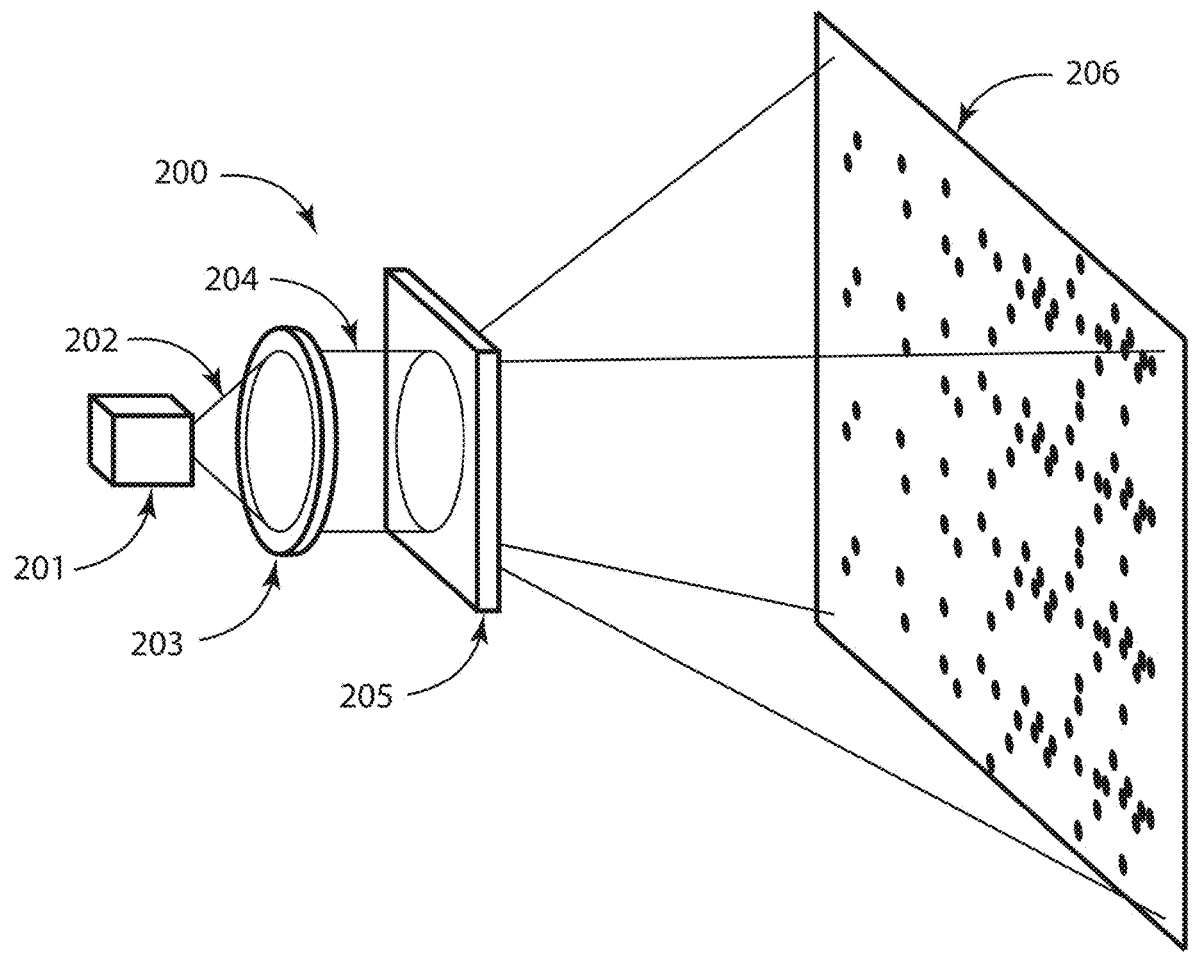
FIG. 2 is a simplified drawing of an embodiment of a pattern projection device where the pattern generating element may be a diffractive optical element.

Reference is made to FIG. 2, which illustrates an embodiment of a device 200 for projecting patterned radiation, which may be an example of the device 100 shown in FIG. 1A, for example. In the embodiment of FIG. 2, which is described here as merely an example, the device 200 may include a source of radiation 201. In some embodiments, the radiation source 201 may be a laser diode that emits near-infrared radiation 202. In other embodiments, the radiation 202 may be visible. The radiation 202 emitted by the source 201 may be diverging. A lens 203, which may be an example of a source conditioning element 105 of FIG. 1B, may be included to convert the diverging radiation 202 into a collimated radiation beam 204. The collimated radiation beam 204 may be incident on a diffractive optical element (DOE) 205. The DOE 205 may be an example of the pattern generating elements 102 and 106 shown in FIG. 1A or FIG. 1B. The DOE 205 may convert the collimated beam 204 into a projected radiation pattern 206. One skilled in the art may recognize that the DOE 205 may be engineered to convert a collimated beam into a wide variety of radiation patterns, including but not limited to patterns that may include spatial symbols, where each spatial symbol may include a radiation distribution such that at least one characteristic of the radiation distribution varies spatially. In some embodiments, each pattern element may be a diffracted order produced by the DOE 205. In some embodiments, the radiation pattern may be symmetric about the optical axis of the DOE 205. In some embodiments of the DOE, the DOE may include multiple DOEs. In some embodiments of the DOE, the DOE may be constructed to include a diffractive collimation lens within the DOE. One skilled in the art may recognize that embodiments of the DOE may also be replaced with one or more holographic optical elements as the pattern generating elements. In some embodiments, both the DOE and the collimating lens may be replaced by a holographic optical element.

Figure 3:
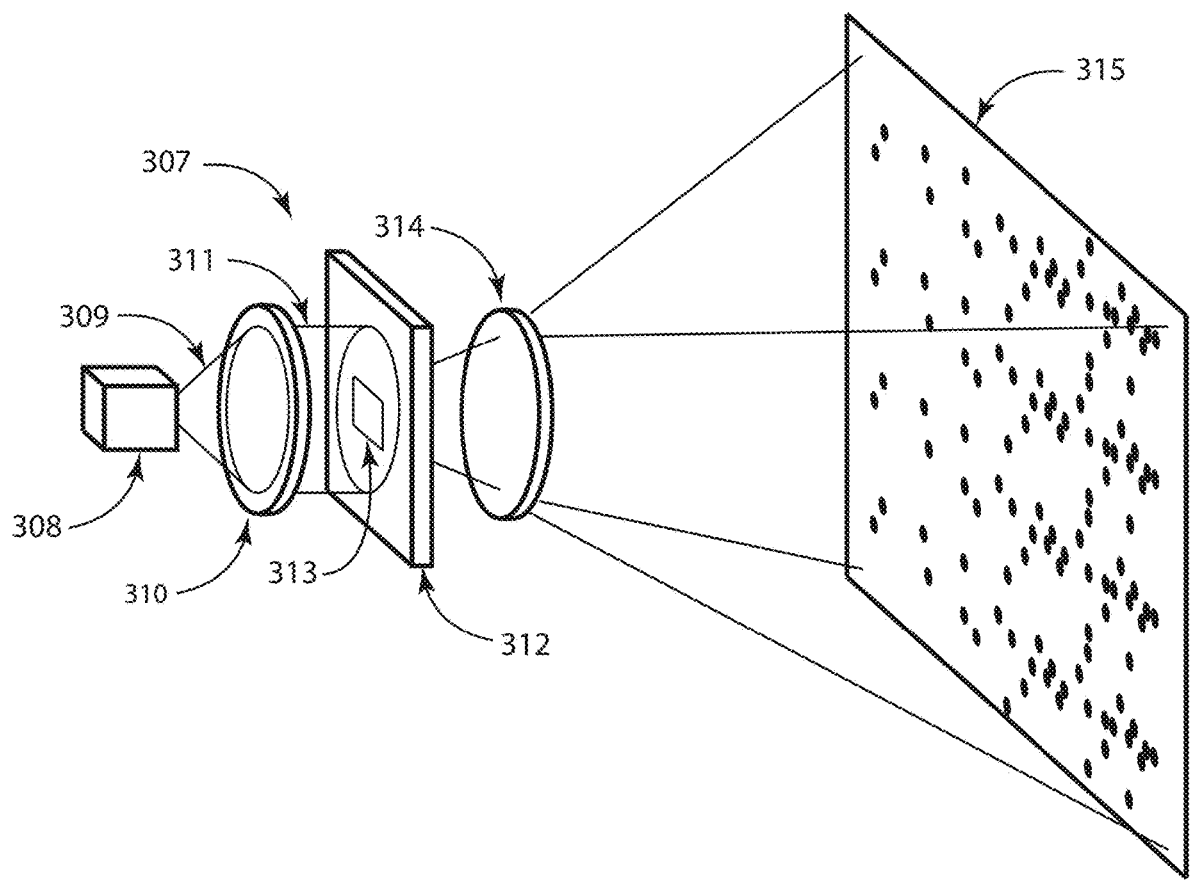
FIG. 3 is a simplified drawing of an embodiment of a pattern projection device where the pattern generating element may be a mask.

Referring now to FIG. 3, another embodiment of a device 300 for projecting patterned radiation is illustrated in accordance with various embodiments. The device 300 may be an example of the device 100 shown in FIG. 1A or device 103 of FIG. 1B, for example. In the embodiment of FIG. 3, the device 300 may include a source of radiation 301. In various embodiments, the source 301 may be a laser, a light-emitting diode, or a lamp. In some embodiments, the source 301 is an array of vertical-cavity surface-emitting lasers. The radiation 309 emitted by the source may be diverging. A condenser lens 310 may be included to collect the radiation emitted by the source 301. The condenser lens 310 may be an example of a source conditioning element 105 of FIG. 1B, for example. In some embodiments, the condenser lens 310 may be replaced by a collimating lens. The condenser lens 310 may output directed radiation 311 in the direction of a mask 312. The mask 312 may be an example of the pattern generating element 102 of FIG. 1A and/or pattern generating element 106 of FIG. 1B, for example. In some embodiments, the mask 312 may be a binary amplitude mask. In other embodiments, it may be a gray scale mask or a phase mask, for example. In the case of a binary amplitude mask, the mask may include multiple apertures distributed over an area 313, where each aperture may produce a pattern element. The spatial arrangement of apertures in the mask 312 may correspond to the arrangement of pattern elements in spatial symbols and to the arrangement of spatial symbols in the projected radiation pattern. A projection lens 314 may be included to form an image of the mask 315 in the far field. The projection lens 314 may be an example of the projection element 107 of FIG. 1B, for example. In some embodiments, the projection lens 314 may have a small effective aperture in image space in order to produce an image of the mask 315 with a large depth of field. The image of the mask in the far field 315 may be an example of a projected radiation pattern. The image of the mask 315 may be projected onto an object or scene in some cases.

Figure 4:
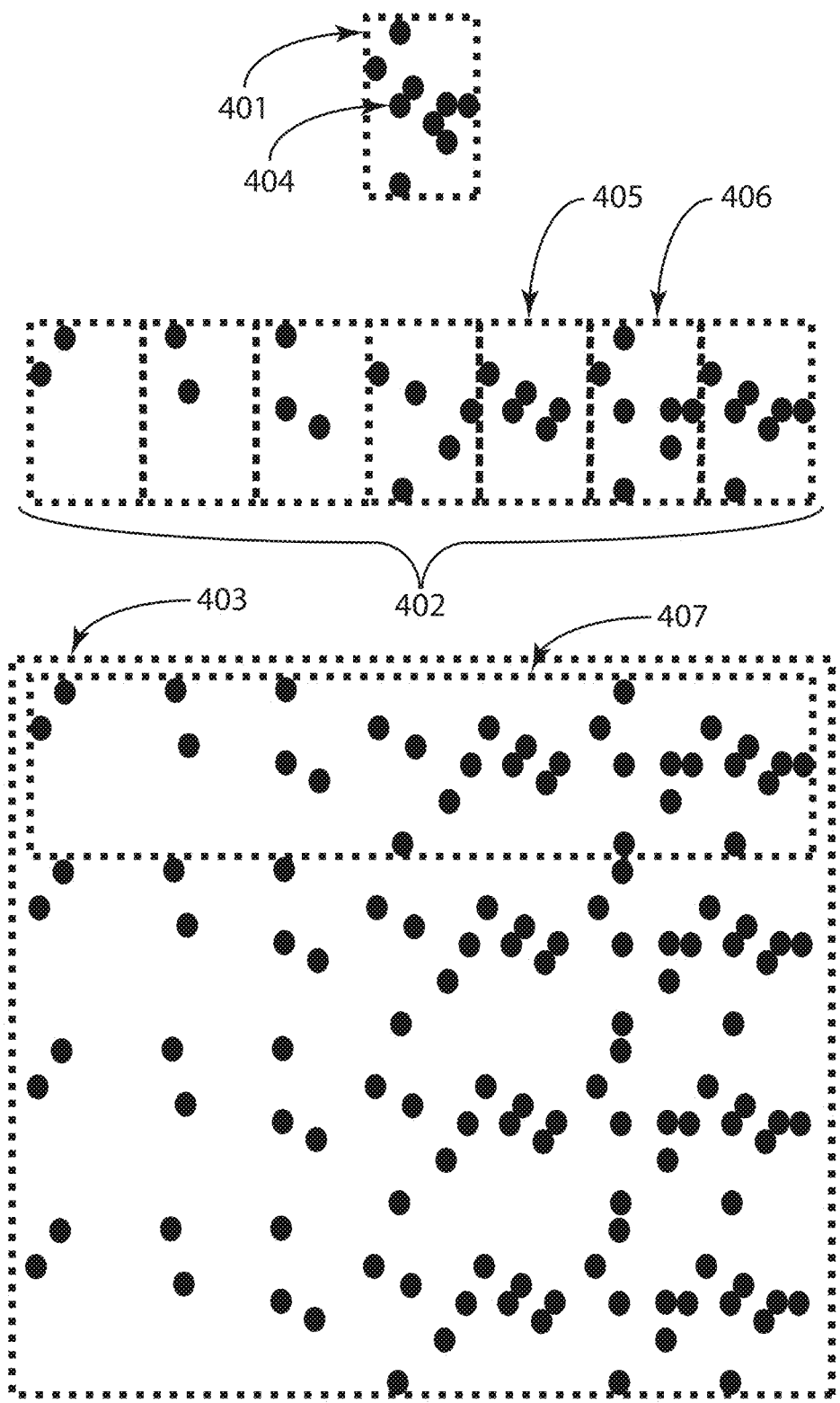
FIG. 4 is a simplified drawing showing an embodiment of a radiation pattern, including a 2D master spatial symbol, a set of 2D spatial symbols, and/or a 2D pattern including 2D spatial symbols.

Turning now to FIG. 4, an example of an embodiment of a radiation pattern projected by the device is provided in accordance with various embodiments. The radiation pattern 403 may include multiple spatial symbols 402, of which spatial symbols 405 and 406 may be examples. According to one embodiment, the multiple spatial symbols may be arranged spatially as an arrangement or set 407. An arrangement of spatial symbols may refer to a collection of spatial symbols with a specific ordering or spatial layout in some cases. A set of spatial symbols may be refer to a collection of spatial symbols without making reference to any specific ordering or spatial layout in some cases. According to various embodiments, such a set or arrangement of spatial symbols 407 may include all spatial symbols that make up the multiple spatial symbols, or it may include a subset of the spatial symbols that make up the multiple spatial symbols. The radiation pattern 403 may be made up of a single arrangement of spatial symbols, or multiple arrangements of spatial symbols. In some embodiments, a given arrangement of spatial symbols may be repeated one or more times at different spatial locations throughout the pattern. Multiple differing arrangements of spatial symbols may also be present in the pattern. The differing arrangements may differ in various ways, including the number of spatial symbols present, the identity of the spatial symbols used, and/or the relative locations of symbols within the arrangement. Merely for the purposes of illustration, FIG. 4 shows a pattern 403 that may include an arrangement 407 of seven spatial symbols repeated four times. It will be apparent to one skilled in the art that the number of spatial symbols, the spatial arrangement of spatial symbols, and/or the number and locations of the arrangements within the pattern may differ from the example embodiment illustrated. The radiation pattern 403 may be an example of the radiation pattern 206 shown in FIG. 2, as well as of the radiation pattern 315 shown in FIG. 3, for example.

The characteristics of the spatial symbols making up the arrangement 407 may form one aspect in accordance with various embodiments and may produce significant advantages for methods and systems using the device. By choosing the spatial symbols making up the arrangement 407 such that the spatial symbols may be distinguishable from one another, the symbols may be used to encode information in the pattern. To enable rapid and/or efficient decoding, for example, it may be useful to choose the symbols such that in addition to being distinguishable from one another, they may also be similar to a master symbol 401. According to some embodiments, the master symbol 401 may be the basis for the radiation pattern, and it may be used to define a multiple spatial symbols 402 in some cases. The master symbol 401, may be a theoretical construct, without a physical manifestation, whereas the spatial symbols may be embodied physically within a characteristic of radiation, such as amplitude, frequency, phase, polarization, wavelength, color, or some other characteristic. The master symbol 401 may be an illustrative archetype of the spatial symbols. The master symbol 401 may provide a description of the spatial distribution of the values of one or more characteristics within one or more spatial symbols. Furthermore, such characteristics may include characteristics of pattern elements 404 rather than of the radiation itself. Such characteristics of pattern elements may include the amplitude, phase, frequency, wavelength, position, shape, size, and/or other characteristics of a pattern element. One or more sets or arrangements of spatial symbols 402 may be constructed based on such pattern elements. In some embodiments, the pattern 403 or an arrangement of spatial symbols 407 may include a manifestation of the master symbol 401, whereas in other embodiments the pattern 403 or an arrangement of spatial symbols 407 may not include a manifestation of the master symbol 401. The master symbol 401 may be referred to as a master spatial symbol herein.

According some embodiments, each spatial symbol, of which spatial symbols 405 and 406 may be examples, may be differentiated because the spatial distribution of one or more characteristics making up each spatial symbol may be unique. The symbol differentiation may enable spatial symbols to encode information. In the case of symbols 405 and 406, for example, the characteristic may be a spatial amplitude modulation. By way of example, the amplitude modulation may take the form of dots making up each symbol, where each dot may be a pattern element 404. In the illustrative example of FIG. 4, spatial symbol 405 may include five dots arranged spatially, and spatial symbol 406 may include seven dots arranged spatially. Because different pattern elements may appear within each spatial symbol, the spatial symbols may be differentiated by examining which pattern elements may be present. Thus, the spatial distribution of one or more characteristics making up the spatial symbols within the radiation pattern may enable symbol differentiation. Examples of spatial distributions of characteristics making up symbols may be characteristics of radiation such as amplitude, phase, frequency, color, polarization, or some other characteristics, or they may be characteristics of pattern elements, such as size, shape, position, brightness, and/or some other characteristic.

According to various embodiments, each spatial symbol of a set 402 or arrangement 407 of spatial symbols may be similar because they may be based on the master symbol 401. For example, in FIG. 4 the master symbol 401 may include nine pattern elements 404, illustrated as dots with a particular spatial arrangement. The spatial symbols making up the set 402 and/or the arrangement 407 may each be based on the nine pattern elements in the master symbol 401. In this example, each spatial symbol may have been designed by eliminating one or more pattern elements from the master symbol 401. The remaining pattern elements making up each symbol may be located within the symbol at the same locations as in the master symbol. The similarity between the master symbol 401 and each spatial symbol may be quantified by a normalized spatial cross-correlation between the master symbol 401 and the characteristic distribution of each spatial symbol. For example, the peaks of the normalized spatial cross correlation of the master symbol 401 and each of the spatial symbols may exceed a threshold.

In some embodiments of spatial symbols making up the arrangement, the arrangement itself may display unique properties that may be created by the basis of master symbols. In an embodiment where the amplitude of each pattern element may be modulated at least once across the arrangement, the arrangement itself may not be periodic because no single pattern element may repeat. The properties of this embodiment may create a unique problem to spatial neighborhood decoding algorithms because no single pattern element and/or set of pattern elements may reliably be used to locate the spatial symbol. This property may be substantially different than other patterns that may have relied on specific pattern elements for location of the spatial symbol. The modulation may make such location techniques impossible. In some embodiments, algorithms such as the cross-correlation may enable the location of spatial symbols. Similar properties may arise in some embodiments where the spatial symbols may be irregular across the arrangement; the lack of regular spacing may remove the ability to reliably locate specific pattern elements. As a result, algorithms such as the cross correlation may be necessary to recognize said pattern elements.

Figure 5:
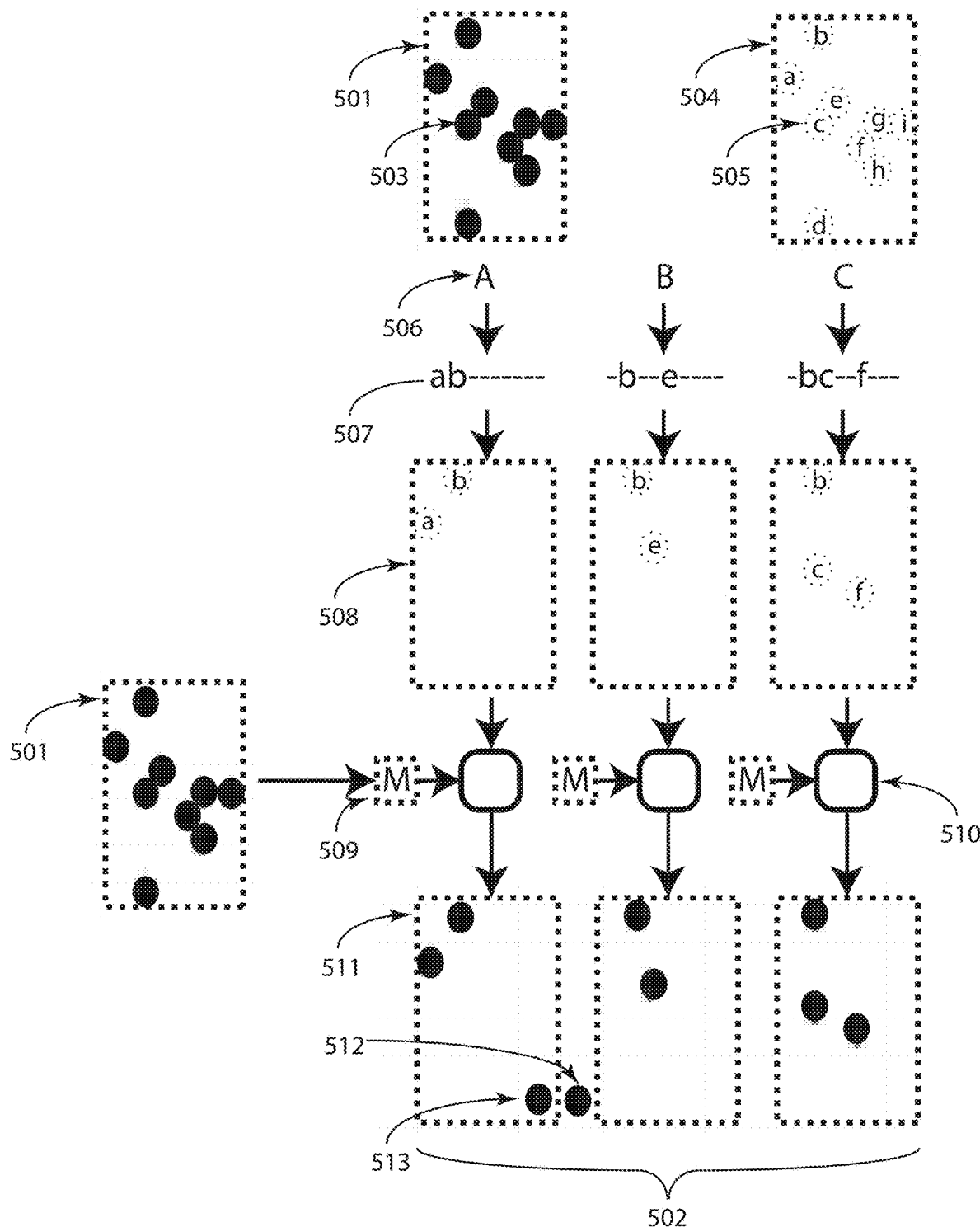
FIG. 5 illustrates how a set of 2D spatial symbols may be constructed as spatially modulated copies of the master spatial symbol in accordance with various embodiments.

Referring to FIG. 5, one embodiment of a method for the formation of spatial symbols based on a master spatial symbol 501 is provided in accordance with various embodiments. This method may produce a set of spatial symbols where the spatial symbols may be distinguished from one another, and where each spatial symbol may exhibit similarity to a master spatial symbol 501. The master spatial symbol 501 may or may not be included as a member of the resulting set of spatial symbols. The master spatial symbol 501 may be a theoretical construct, a stored image, a radiation distribution, and/or some other construct. In some embodiments, the master spatial symbol 501 is a spatial map of characteristic values, where the characteristic values are values of a characteristic of a radiation field that may vary spatially. Examples of such characteristics include amplitude, frequency, phase, wavelength, and/or other characteristics. The master spatial symbol 501 may include pattern elements 503. The pattern elements 503 may be local spatial distributions of characteristic values within the symbol. In FIG. 5, the pattern elements 503 may be depicted as dots, though pattern elements may take on other shapes. Pattern elements 503 may be regions of either high or low characteristic values, or they may include varying characteristic values, for example. One or more pattern elements may be isolated from other pattern elements. And in contrast, one or more pattern elements may partially overlap. The master spatial symbol 501, also shown as 504, may provide a blueprint for some pattern element locations 505. In some embodiments, the master spatial symbol may be sparsely populated with pattern elements. In some embodiments, the master spatial symbol may be designed to be identical when rotated by a specified angle.

The set of spatial symbols may be constructed by modulating the pattern elements 503 of the master spatial symbol 501. Each spatial symbol in the set may be identified by a label 506. By way of example, FIG. 5 may illustrate a set of three spatial symbols labeled A, B, and C. In some embodiments, the modulation of the master spatial symbol pattern elements may be an amplitude modulation. In other embodiments, another characteristic may be modulated. Note that one characteristic may be modulated spatially to produce the pattern elements making up the master symbol, while one or more other characteristics may be modulated to form the set of spatial symbols. For example, the master spatial symbol may describe a spatial distribution of radiation amplitudes, where regions of high amplitude may form pattern elements. Then, to form the set of spatial symbols, the color or shape (or some other characteristic) of each individual pattern element may be modulated. In some embodiments, the modulation of the pattern elements for each spatial symbol may be an amplitude modulation that may take place over a grid of pixelated spatial locations. In some embodiments, the spatial modulation may include one or more of amplitude modulation, phase modulation, frequency modulation, polarization modulation, position modulation, pulse modulation, shape modulation, and/or some other modulation. In the case of the amplitude modulation shown in FIG. 5, for example, the modulation may be a binary on/off modulation, or it may include a continuous range of possible values.

To implement the modulation of the master spatial symbol pattern elements 503 to produce the set of spatial symbols, the pattern elements may be labeled 505. In the illustrative example of FIG. 5, the pattern elements have been labeled a through g. Each spatial symbol may then include a subset of these labeled pattern elements. Each spatial symbol may have a blueprint or map 508 that may describe the modulation to be applied to the master spatial symbol to form the spatial symbol. The modulation values may also be described as a vector 507 in some cases. For example, spatial symbol A may be shown to include the pattern elements a and b with unit modulation, while the other pattern elements may be modulated so that they may have zero value, or do not appear, within spatial symbol A. Similarly, spatial symbol B may include only the pattern elements b and e, and spatial symbol C may include only pattern elements b, c, and f. The modulation values described by the map 508 may be applied to the master spatial symbol 501 (also shown abbreviated as 'M' 509) through a modulation operation 510 to form the spatial symbol 511. The set 502 of spatial symbols may then be arranged to produce a radiation pattern. Each spatial symbol 511 may be distinguished from the other spatial symbols in the symbol set. In this example embodiment, the spatial modulation map 508 may provide the information to identify each spatial symbol. Each spatial symbol 511 may exhibit a similarity to the other spatial symbols in the spatial symbol set 502 because they may all be based on the master symbol 501. In some embodiments, this similarity may be quantified using a cross-correlation operation between the master spatial symbol and each spatial symbol. In some embodiments, this similarity may be quantified using a cross-correlation operation between the master spatial symbol and an arrangement of spatial symbols. In some embodiments, similarity may be quantified using a sum of absolute differences operation in place of the cross-correlation operation.

Note that the spatial symbols may not be limited to the pattern elements present in the master spatial symbol. For example, the spatial symbol 511 may include a pattern element 513 that may not be present in the master spatial symbol 501. Furthermore, it will be noted that the radiation pattern including an arrangement of spatial symbols may include one or more additional pattern elements 512 that may not be present in the master spatial symbol 501. One skilled in the art may recognize that the pattern elements 503 in FIG. 5 may take the form of dots merely as one example embodiment. Other embodiments of pattern elements 503 may include shapes such as rectangles, analog gradients such as a Gaussian beam profile, extended structures like curves or loops, and/or other spatial distributions, for example. In some embodiments, the pattern elements 503 may be spatially isolated from other pattern elements as illustrated in FIG. 5, whereas in other embodiments one or more pattern elements 503 may spatially overlap with one or more other pattern elements.

Figure 6:
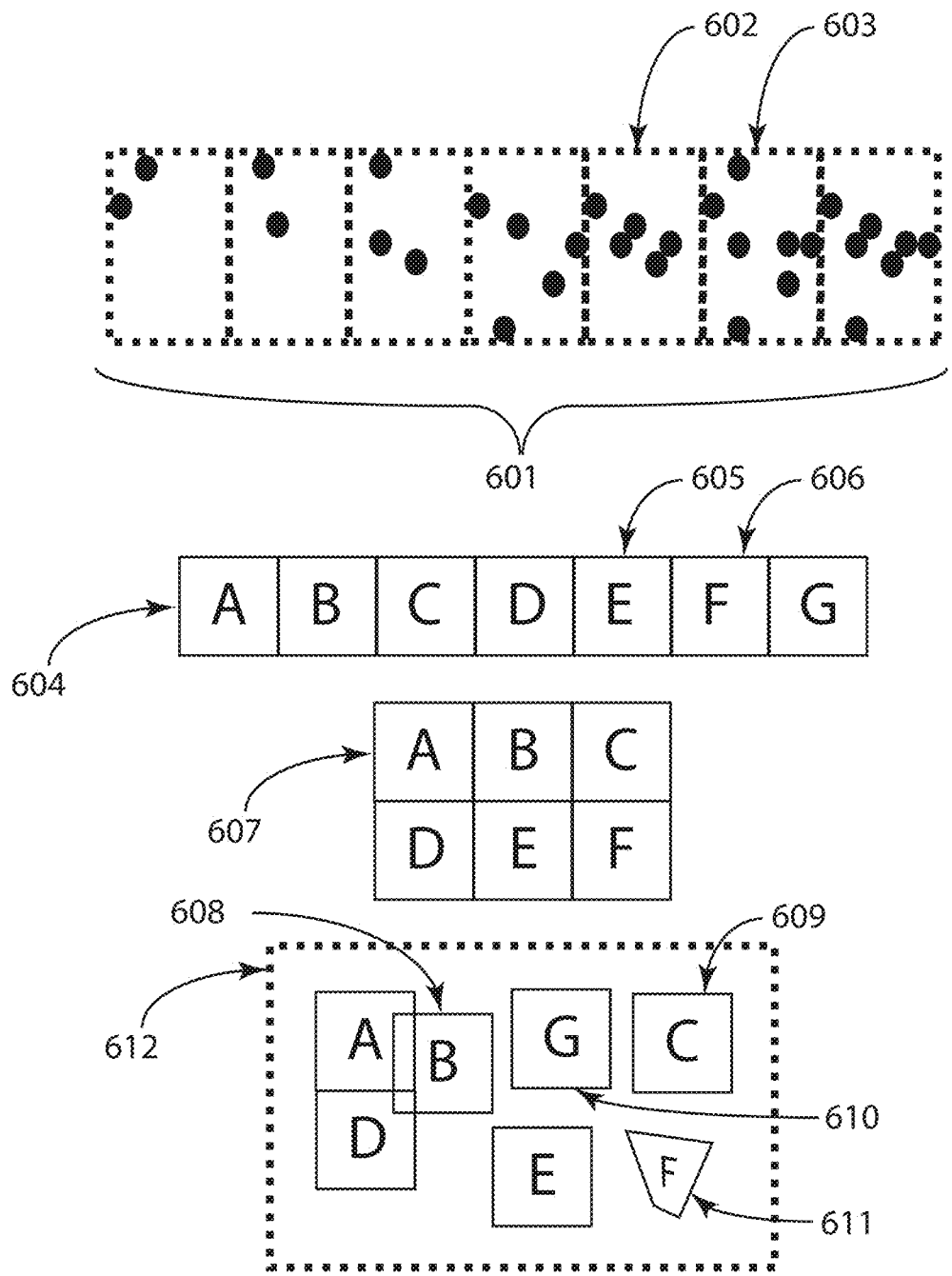
FIG. 6 illustrates various embodiments of spatial symbols placed within the radiation pattern.

Turning now to FIG. 6, arrangements of spatial symbols within a radiation pattern are provided in accordance with various embodiments. Specifically, FIG. 6 may illustrate arrangements of spatial symbols where each spatial symbol may appear once and only once. In other embodiments, arrangements may contain repeated spatial symbols, or one or more spatial symbols from a set may be excluded from an arrangement. For example, FIG. 6 may illustrate a set 601 of spatial symbols. Spatial symbols 602 and 603 may be examples of spatial symbols included in the set. Arrangement 604 may be one embodiment of an arrangement of the spatial symbol set 601, where the spatial layout of the symbols within the arrangement may match the spatial layout in the illustration of the set 601. In the illustration of the arrangement 604, the spatial symbols may be identified by a label A through G. For example, the spatial symbol labeled E 605 may correspond to the spatial symbol 602 in the set 601. Similarly, the spatial symbol labeled F 606 may correspond to the spatial symbol 603 in the set 601. Arrangement 604 may be an example of an arrangement of spatial symbols that may be included in a radiation pattern. In arrangement 604, the spatial symbols may be arranged in a single row. Arrangement 607 may illustrate an embodiment where the spatial symbols may be arranged in two rows. Arrangement 608 may illustrate yet another embodiment, where the spatial symbols may be arranged irregularly. Whereas arrangements 604 and 607 may utilize a tiling of spatial symbols such that spatial symbols may be adjacent to one another and may not overlap, arrangement 612 may show that spatial symbols may overlap other spatial symbols, such as spatial symbol B 608, spatial symbols may not be aligned to other spatial symbols, spatial symbols may be separated from other spatial symbols, such as spatial symbol G 610, spatial symbols may be re-ordered relative to their order in the set, such as spatial symbols G 610 and C 609, and spatial symbols may be scaled, rotated, and/or distorted as spatial symbol F 611. Scaling spatial symbols within various embodiments of the device 102 and 103 of FIG. 1A and/or FIG. 1B can, for example, be used to compensate for scaling caused by elements of the system. In one embodiment, referring back to FIG. 3, the apertures 313 in a mask 312 may produce distorted spatial symbols in order to compensate for distortion introduced by the projection lens 314, which may result in a radiation pattern 315 including substantially undistorted spatial symbols. The example illustrated spatial symbols set 601 may include spatial symbols based on the same master spatial symbol. Some embodiments of the arrangements may include spatial symbols from multiple spatial symbol sets based on multiple master spatial symbols.

Figure 7:
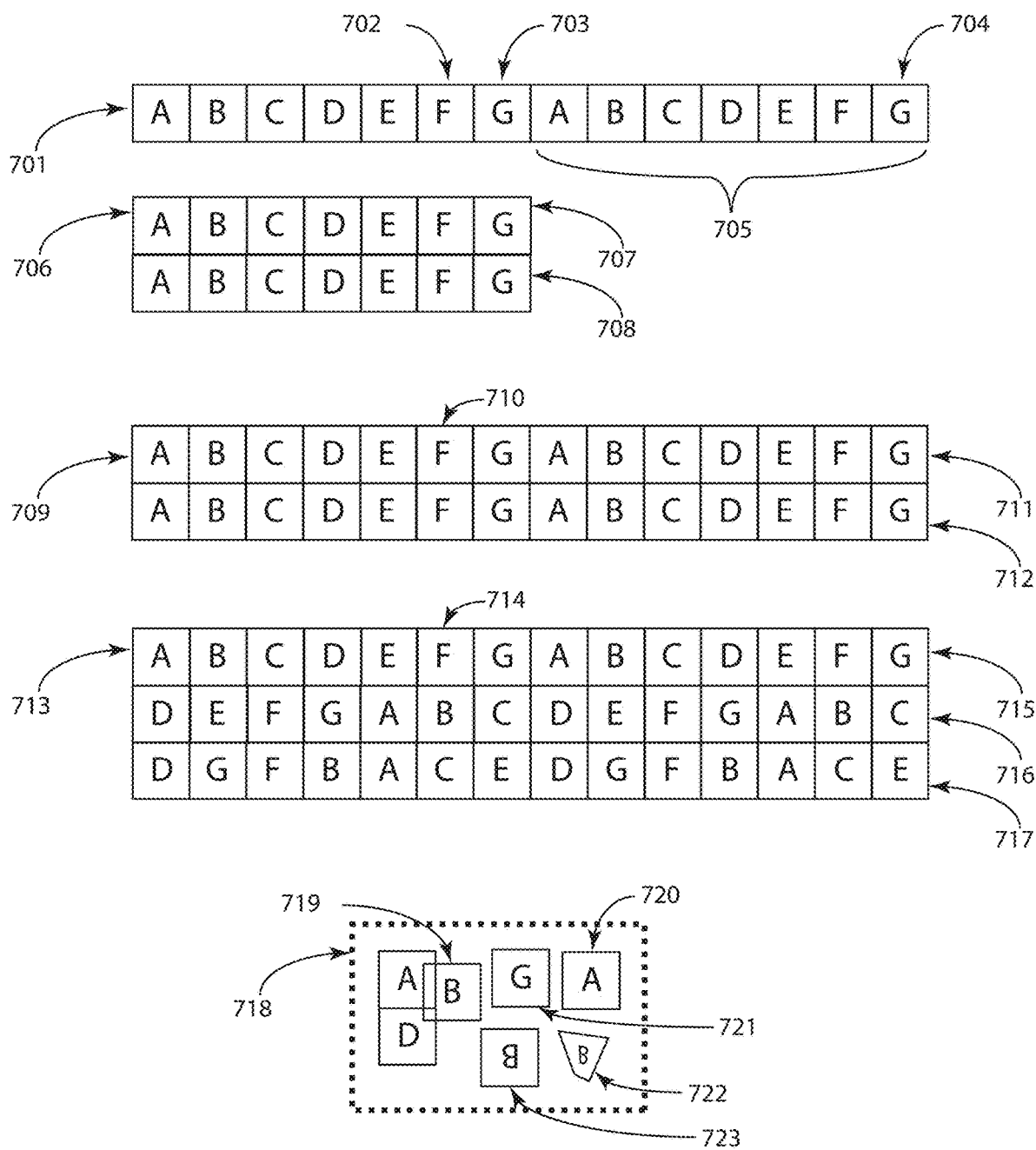
FIG. 7 illustrates various embodiments of repeated spatial symbols within the radiation pattern.

FIG. 7 provides radiation patterns in accordance with various embodiments that may include repeated arrangements of spatial symbols and arrangements of spatial symbols where one or more spatial symbol may be repeated. In some embodiments, a radiation pattern may include a single arrangement of spatial symbols. In some embodiments, a radiation pattern 701 may include an arrangement 705 of spatial symbols that may repeat one or more times. In the radiation pattern 701, the arrangement 705 may be repeated along a first dimension, illustrated as repetitions across a row. The radiation pattern 701 may thus contain repeated spatial symbols, of which 702, 703, and 704 are examples. More specifically, spatial symbol 704 may be a repeated instance of spatial symbol 703. In another embodiment, a radiation pattern 706 may include arrangements 707 and 708 of spatial symbols that may repeat along a second dimension, illustrated as repetitions down a column. In this example, arrangement 708 is a repeated instance of arrangement 707. In yet another embodiment, a radiation pattern 709 may include arrangements that may repeat along a first dimension and a second dimension. Arrangements 711 and 712 may provide examples of instances of repeated arrangements in a first dimension and a second dimension, respectively. In yet another embodiment, a radiation pattern 713 may include multiple arrangements of spatial symbols. In the illustrative example of FIG. 7, the top row of radiation pattern 713 may include two repetitions of an arrangement of spatial symbols ordered A-B-C-D-E-F-G. The second row of radiation pattern 713 also may include two repetitions on an arrangement of spatial symbols ordered D-E-F-G-A-B-C, where the ordering may be the same as in the arrangements of the first row, except a circular shift may have been applied to the symbol element locations within the arrangement. The third row of radiation pattern 713 may include two repetitions of an arrangement of spatial symbols ordered D-G-F-B-A-C-E, which may represent a distinct arrangement because of the change in ordering relative to prior arrangements. In this example, the arrangements may include spatial symbols with the same identities, labeled A through G, but in other examples, a radiation pattern may include multiple arrangements whose constituent spatial symbols differ from arrangement to arrangement. In yet another embodiment, a radiation pattern 718 may include one or more arrangements where one or more spatial symbols may repeat. In the example shown, spatial symbol 720 may represent a second instance of spatial symbol A. Likewise, spatial symbols 722 and 723 may represent repeated instances of spatial symbol B 719. The repeated instances of spatial symbols may be scaled, rotated 723, distorted 722, and/or transformed in some other way, for example.

Figure 8:
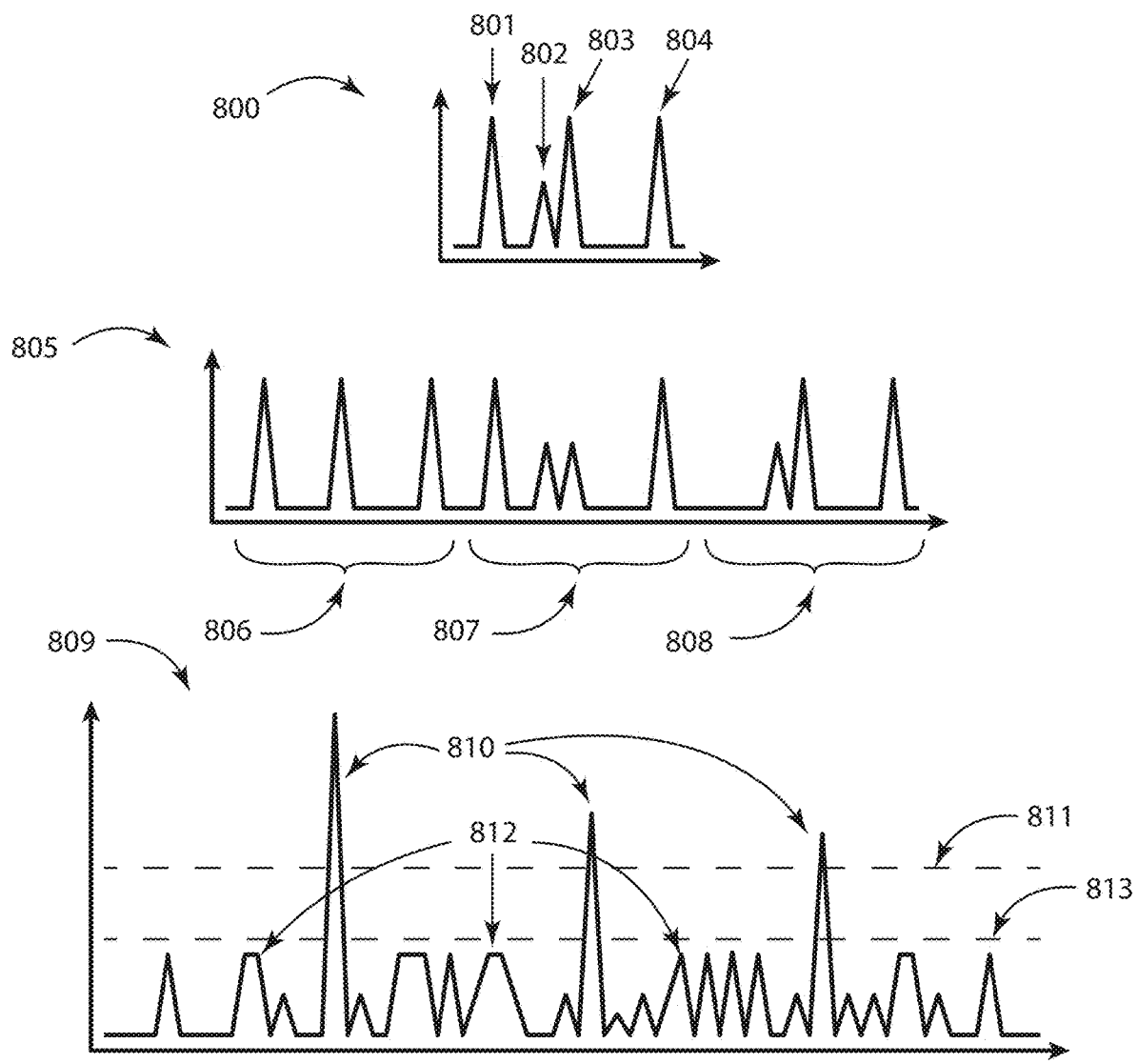
FIG. 8 illustrates a 1D cross-correlation between a 1D master symbol and a 1D pattern in accordance with various embodiments.

FIG. 8 may illustrate measures of symbol similarity in accordance with various embodiments. In contrast to other areas of spatial neighborhood encoding, which may have focused on engineering spatial neighborhoods to be unique, some embodiments introduce a measure of similarity among spatial symbols making up a radiation pattern. As described previously, the radiation pattern may include multiple spatial symbols that may each be unique relative to one another, but that may also all be similar to a master spatial symbol. In some cases, spatial correlation may be utilized to examine the degree of similarity and/or the relative location of similar entities. To illustrate the properties of a spatial cross-correlation and how it may be used to examine symbol similarity, FIG. 8 may present a one-dimensional master spatial symbol 800. As an illustrative example, the master spatial symbol 800 may include four pattern elements, 801-804, which merely as an example embodiment, may be depicted as amplitudes across a one dimensional range of spatial locations.

FIG. 8 also shows an example of a radiation pattern 805, which may include an arrangement of three spatial symbols 806, 807, and 808. The spatial symbols may each be constructed by modulating one or more pattern element in the master spatial symbol 800. For example, the pattern element 802 may not be present in spatial symbol 806, the pattern element 803 may be reduced in amplitude in spatial symbol 807, and/or the pattern element 801 may not be present in spatial symbol 808. As a measure of similarity, a spatial cross-correlation may be performed between the master spatial symbol and the spatial symbols, or between the master spatial symbol 800 and the arrangement of spatial symbols 805. FIG. 8 may illustrate the result 809 of the spatial cross-correlation between the master spatial symbol 800 and the arrangement 805. Each point along the spatial cross-correlation result may be the sum of the vector inner product between an offset copy of the master spatial symbol and the arrangement. In the illustrated embodiment, the domain of the spatial cross correlation result 809 may be the relative offset between the right edge of the master spatial symbol 800 and the left edge of the arrangement 805. The left edge of the cross correlation result domain may correspond to a relative offset of zero wherein just a single point overlaps between the master spatial symbol 800 and the radiation pattern 805. The plot 809 of the spatial cross-correlation may be interpreted as a spatial map of the degree of similarity between the master spatial symbol 800 and the arrangement 805. Peaks 810 in the spatial cross-correlation result may indicate regions of the arrangement that may be similar to the master spatial symbol 800. The amplitude of each peak may provide a measure of the degree of similarity between each spatial symbol and the master symbol 800. A peak with a greater amplitude may indicate radiation distribution that may be more similar to the master spatial symbol 800 than a radiation distribution that produces a cross-correlation peak with a lesser amplitude. To define a minimum level of similarity between the spatial symbols and the master spatial symbols 800, one may introduce a threshold 811 that the cross-correlation peaks associated with each spatial symbol may exceed. In the shown embodiment, the three cross-correlation peaks 810, which may correspond to the spatial symbols 806, 807, and 808, each may exceed the threshold 811. This may ensure that each spatial symbol may be sufficiently similar to the master spatial symbol 800. In some embodiments, it may be possible to describe two thresholds; a threshold for isolated spatial symbols and/or a threshold chosen for symbols within an arrangement of spatial symbols.

In addition to providing a measure of similarity, the spatial cross-correlation may also serve as a tool to detect and/or locate spatial symbols within a radiation pattern, or within a formed image of a scene illuminated with patterned radiation. In the illustrated embodiment, the three peaks 810 may occur at relative offsets where the right edge of the master spatial symbol 800 may be aligned to the right edge of multiple spatial symbols. Here, the spatial-cross correlation may have been shifted to show that the peaks of the spatial cross correlation 810 may occur at relative offsets that may be aligned with the locations of the spatial symbols within the arrangement. The existence of the peaks 810 may indicate the presence of one or more spatial symbols within the arrangement. The positions of the peaks within the cross-correlation result 809 may provide a measure of the location of the corresponding spatial symbol within the arrangement. This may be accomplished by noting the relative offset location of the correlation peaks within the correlation result 809, which may correspond to a spatial symbol located at a corresponding offset within the arrangement. For example, in some embodiments where the size of the master spatial symbol 800 may be known, the location of the right edge of each spatial symbol may be calculated by subtracting the width of the master spatial symbol from the relative offset the cross-correlation peaks 810.

In some embodiments, the spatial symbols and their arrangement may be chosen such that correlation peaks above a threshold 811 may only occur at relative offsets corresponding to the positions of the spatial symbols within the arrangement. At other locations, the cross-correlation may have side lobes 812, which may indicate the degree of symbol similarity when the master symbol is not aligned with a spatial symbol. Here, the term side lobe may be used to denote any value in the cross-correlation result 809 that may not correspond to the location of a spatial symbol within the arrangement. The spatial symbols and their arrangement may be chosen such that the side lobes fall below a second threshold, where the second threshold may be less than or equal to the first threshold. This property of the side lobes may indicate that all relative offsets of the master symbol, other than the relative offsets that align the master symbol with a spatial symbol, may demonstrate low levels of similarity. Whereas the first predetermined threshold may reflect the degree of similarity of any one spatial symbol to the master spatial symbol, the ratio of the first threshold to the second threshold may indicate how well similarity has been suppressed for relative offsets of the master symbol that may not align with the spatial symbols. By ensuring that all side lobes fall below the second threshold, the cross-correlation between the master spatial symbol and the arrangement may be used to reliably detect and/or locate spatial symbols within the arrangement with a high degree of confidence. For example, a peak detection and location method may be used to detect and locate cross-correlation peaks, and those cross correlation peaks may be used to detect and identify detected spatial symbols within the detected radiation pattern. One skilled in the art may recognize that the cross-correlation may be merely one embodiment of a method that measures similarity and the location of that similarity. One embodiment is a normalized cross correlation where the cross correlation may be divided by the product of the vector inner product of both terms within the domain spanned by the master spatial symbol. Another embodiment may remove offsets within the domain spanned by the master spatial symbol to produce a zeroed result. Some embodiments may calculate the squared sum of vector differences (SSD) between the offset master symbol and various regions within the arrangement. Variations of these embodiments may instead use a normalized SSD algorithm (NSSD), a zeroed SSD algorithm (ZSSD), a normalized and zeroed SSD algorithm (NZSSD), sum of absolute differences (SAD), and/or various other template matching metric. Similar maps of similarity may be produced without comparing the detected values to a stored master spatial symbol. These methods may rely on functions derived from the pattern element locations within the master symbol. In some embodiments, a simple function such as $f(x_o, y_o)$ may be calculated for every spatial offset $(x_o, y_o)$ across the arrangement. In an example of these embodiments, $f(x_o, y_o) = \Sigma A^2(x_o + x_i, y_o + y_i)$ may be calculated, where the function $A(x,y)$ may be the normalized arrangement, each pattern element may be indexed as 'i', and the sum may be taken across all pattern element positions $(x_i, y_i)$. Other algorithms or set of algorithms that may provide a measure of similarity and/or a measure of the location of that similarity may be used to detect and locate spatial symbols within arrangements and radiation patterns.

The ability to detect and/or locate spatial symbols using a cross-correlation may provide significant advantages for triangulation-based depth imaging compared to alternative spatial neighborhood methods. In some embodiments that may make use of a fast Fourier transform (FFT) algorithm to calculate the spatial cross-correlation, the number of calculations may be on the order of $N+2N \log 2(N)$, where N may be the number of samples in the detected radiation pattern, and where calculations involving the master symbol may be performed in a separate setup operation. When the number of samples in the detected radiation pattern may be large, an FFT implementation may involve much fewer operations than alternative implementations, such as implementations based on a linear search for spatial symbols. In alternative embodiments where memory may be limited, the spatial cross-correlation may be calculated on data streams using a pipelined cross-correlation architecture. In such embodiments, the number of buffered samples that may be utilized to produce each spatial cross-correlation may be as small as the number of samples in the master symbol.

Figure 9:
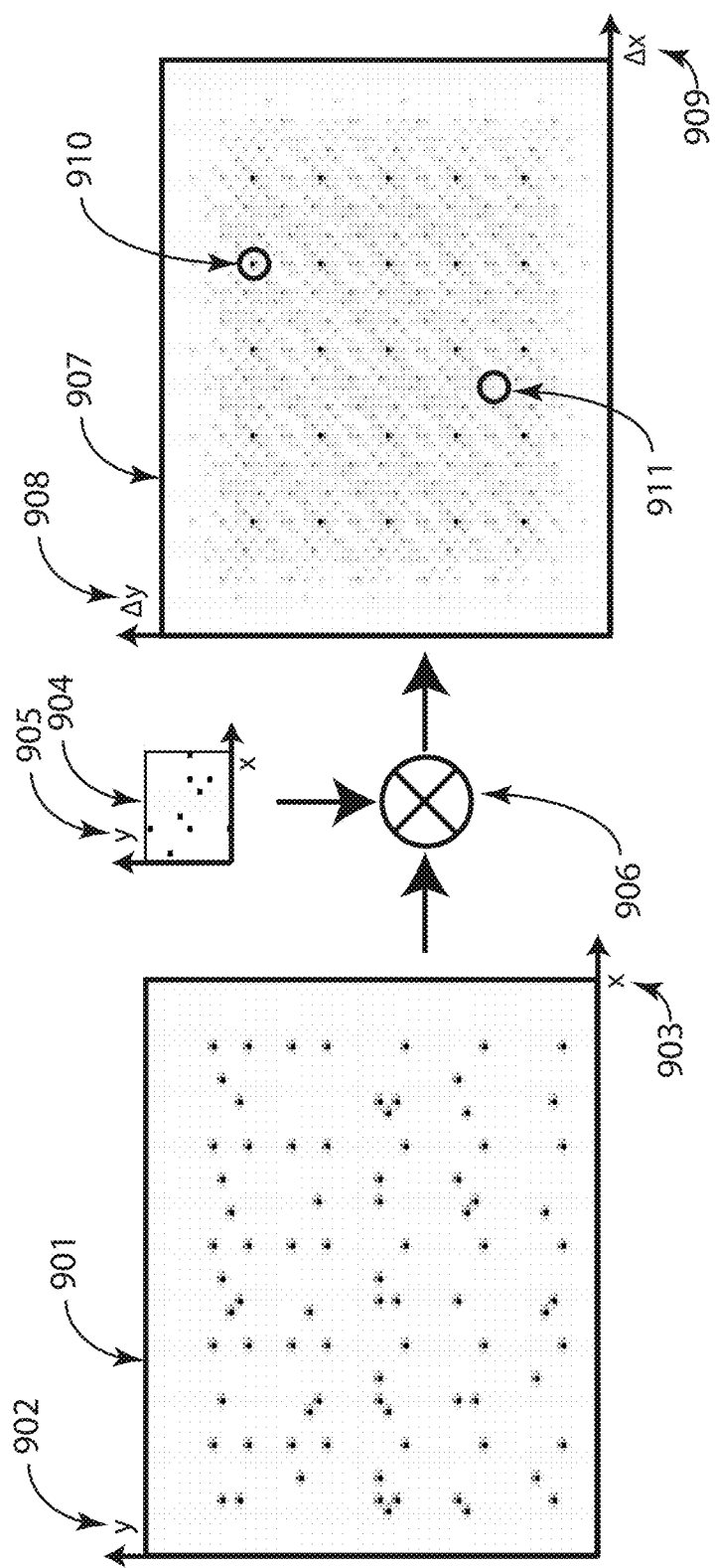
FIG. 9 illustrates a 2D cross-correlation between a 2D master symbol and a 2D pattern in accordance with various embodiments.

Whereas FIG. 8 may illustrate a one dimensional spatial cross-correlation, FIG. 9 may illustrate a two-dimensional spatial cross correlation between a master symbol 904 and an arrangement of spatial symbols 901, which may also represent a detected radiation pattern such as a formed image of a scene illuminated with patterned radiation. In some embodiments where the spatial symbol, the arrangement of spatial symbols, and/or the radiation pattern may be two-dimensional, a two-dimensional spatial cross correlation may be performed and interpreted in a similar manner to the one-dimensional spatial cross-correlation of FIG. 8. In the embodiment illustrated in FIG. 9, a two-dimensional arrangement 901 of spatial symbols may include spatial symbols arranged across two dimensions 902 and 903. The master spatial symbol 904 may also be a two-dimensional construct. The spatial cross-correlation operation 906 may produce a two-dimensional spatial distribution 907 across two relative offset dimensions 908 and 909. The two-dimensional cross-correlation result 907 may be viewed as a two-dimensional analog to the one-dimensional cross-correlation result 809 of FIG. 8. As in the one-dimensional result, the two-dimensional cross-correlation result 907 may exhibit peaks such as 910 and/or side lobes such as 911. In some embodiments, each peak 910 may exceed a first threshold at the offset locations of the spatial symbols, and each side lobe 911 may fall below a second threshold.

Figure 10:
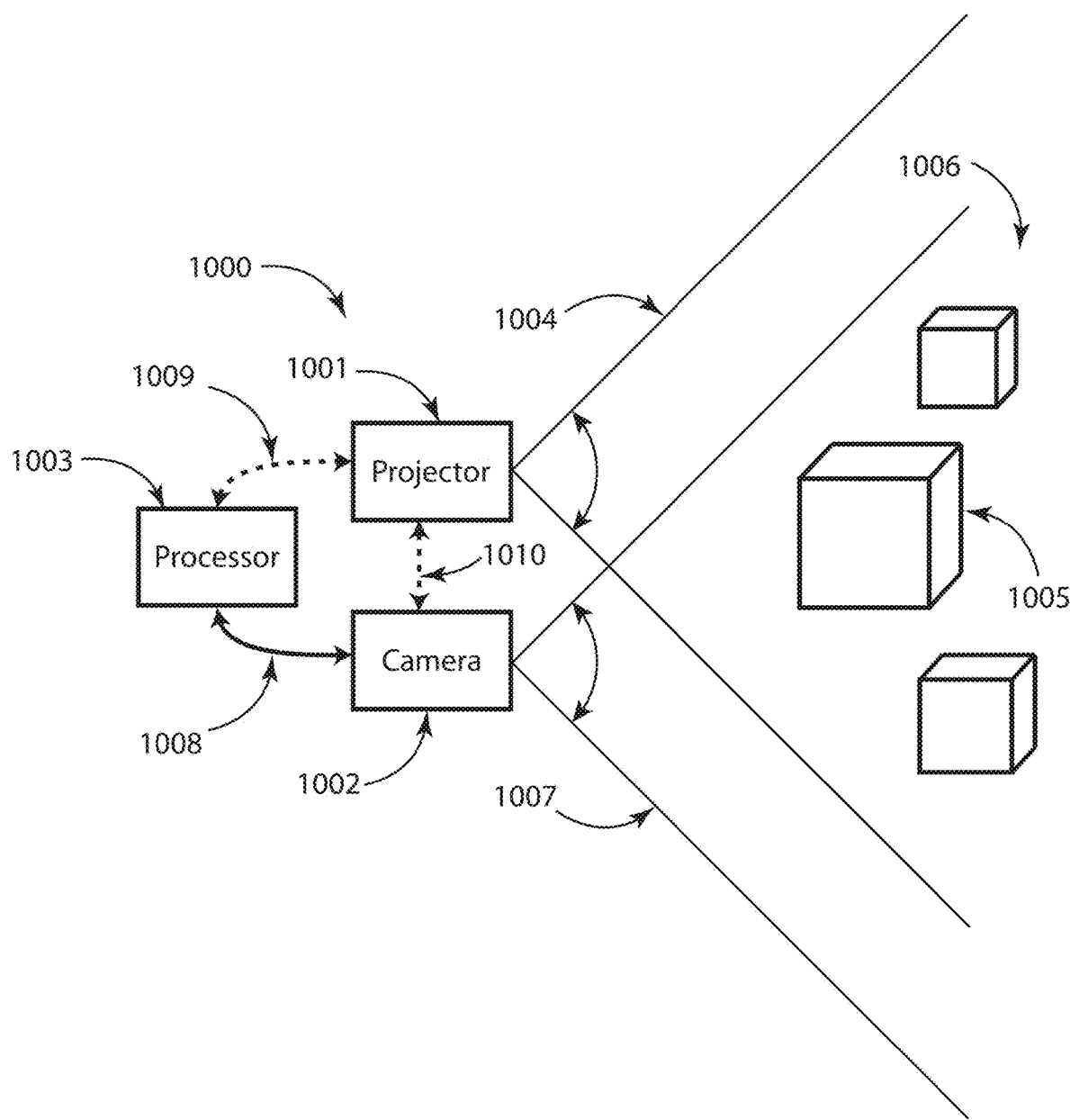
FIG. 10 is a simplified drawing of an embodiment of a 3D measurement system.

Turning now to FIG. 10, a system 1000 for estimating coordinates of a location on an object in a 3D scene may be provided along with related methods. The system 1000 illustrated in FIG. 10 may include a device 1001 for projecting patterned radiation. The device 1001 may be an example of device 100 or 103 illustrated in FIG. 1A and FIG. 1B, respectively, for example. Device 1001 may be an example of device 200 of FIG. 2 and/or device 300 of FIG. 3 in some cases. The patterned radiation projected by the device 1001 may include one or more arrangements of spatial symbols, and those spatial symbols may be distinguishable from one another, and each spatial symbol may be similar to a master spatial symbol. The device 1001, which may be referred to as a projector in some cases, may emit the patterned radiation over a field of view 1004. The patterned radiation may be projected onto a three-dimensional scene 1006, which may contain one or more objects 1005. A detector 1002 may detect the radiation pattern illuminating at least a portion of the 3D scene. In some embodiments, the detector 1002 may be a camera that may utilize a charge-coupled device (CCD) detector array and/or a complementary metal-oxide semiconductor (CMOS) detector array. The field of view 1007 of the camera 1002 may substantially overlap with the field of view 1004 of the projector 1001. The camera 1002 may form an image of at least a portion of the scene 1006 illuminated by the patterned radiation. A processor 1003, which may be in communication 1008 with the camera 1002, may receive the formed image and process the formed image to estimate the coordinates of one or more locations on the surface of one or more objects 1005 in the scene 1006. In some embodiments, the processor 1003 may estimate the coordinates of multiple object points to produce a depth image. The processor 1003 may also be in communication 1009 with the projector 1001, or the projector 1001 may not involve communication with the processor 1001 in some cases. Similarly, the projector 1001 may be in communication with the camera 1002, or the projector may not involve communication with the camera 1002. In some embodiments, a strobe signal from the camera 1002 may be used to activate the projector 1001 during the active exposure time of the camera 1002. In some embodiments, the camera 1002 may be constructed with a bandpass spectral filter that may collect only the spectral band encompassing the projector source and may reject all other radiation sources.

In the system 1000, the projector 1001 may include a radiation source. Examples of radiation sources that may be employed in the projector 1001 include, but are not limited to, laser diodes, light-emitting diodes, arrays of VCSELs, other lasers, and/or lamps. The projector 1001 may also include a pattern generating element, such as a mask, a DOE, and/or a hologram. In some embodiments, the pattern generating element may be integrated with the source. For example, the source may be an array of VCSELs, where the layout of the VCSELs within the array generates the pattern and/or an arrangement of spatial symbols within the pattern. The projector 1001, the camera 1002, and/or the processor 1003 may be integrated together, or one or more of these components may be operated remotely. To estimate the coordinates of one or more locations on one or more objects 1005 in the scene 1006, in some embodiments, the processor 1003 may detect one or more spatial symbols from multiple spatial symbols within the formed image of the 3D scene. Also, the processor 1003 may locate one or more of the detected spatial symbols within the formed image of the 3D scene. Furthermore, the processor 1003 may identify one or more of the detected spatial symbols. Once one or more spatial symbols may have been detected, located, and/or identified, the angular information conveyed by the spatial symbols may be used in conjunction with angular information from the formed image to triangulate the coordinates of one or more locations on one or more objects 1005 in the scene 1006. In some embodiments, the processor 1003 may detect one or more pattern elements within the spatial symbols. The processor 1003 may also locate one or more pattern elements within the spatial symbols. Furthermore, the processor 1003 may identify one or more of the detected pattern elements in some cases. Once one or more pattern elements have been detected, located, and/or identified, the angular information conveyed by the pattern elements may be used in conjunction with angular information from the formed image to triangulate the coordinates of one or more locations on one or more objects 1005 in the scene 1006.

In general, system 1000 may be configured for estimating the coordinates of a location on an object in a 3D scene in accordance with various embodiments. The system 1000 may include a device for projecting patterned radiation such as projector 1001. The device 1001 may include a radiation source. The device 1001 may include a pattern-generating element configured to produce a radiation pattern. The radiation pattern may include multiple spatial symbols. Each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols.

In some embodiments of system 1000, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

System 1000 may include one or more detector elements such as camera 1002 that may be configured to detect the radiation pattern illuminating at least a portion of the 3D scene. System 1700 may include one or more processors, such as processor 1003, which may be configured to estimate the coordinates of the location on the object in the 3D scene based on the detected radiation pattern.

In some embodiments of system 1000, the radiation source includes at least a laser diode, an array of vertical-cavity surface-emitting lasers, a light-emitting diode, or a lamp. In some embodiments, the pattern-generating element includes at least a mask, a diffractive optical element, or a hologram.

In some embodiments of system 1000, at least one of the device for projecting patterned radiation, the one or more detector elements, or the one or more processors are embedded within a mobile electronic device. In some embodiments, at least one of the device for projecting patterned radiation, the one or more detector elements, or the one or more processors are operated remotely.

Figure 11:
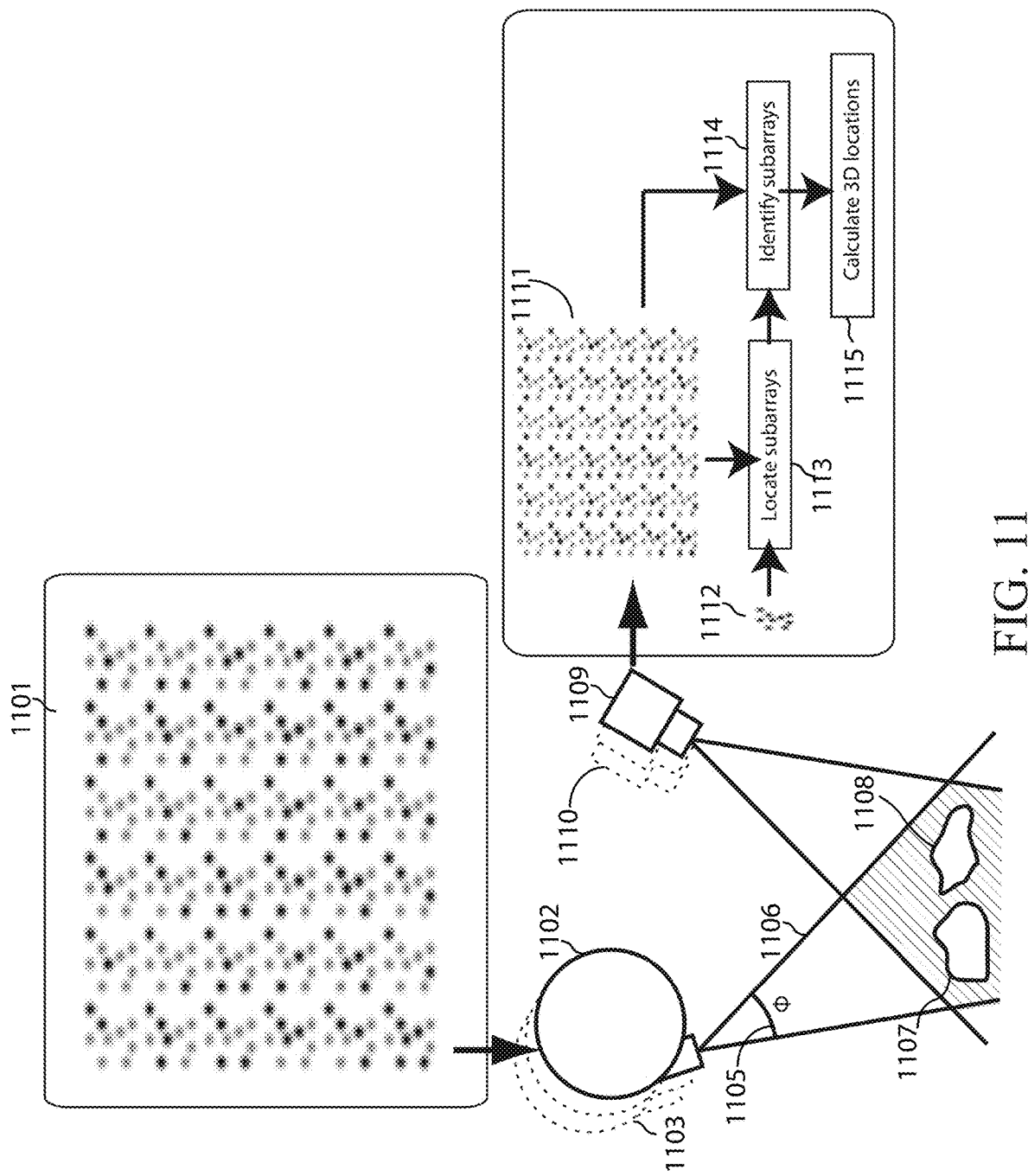
FIG. 11 is a detailed drawing of an embodiment of a 3D measurement system.

FIG. 11 relates to systems and methods for estimating coordinates of a location on an object in a 3D scene in accordance with various embodiments. A system 1100 illustrated in FIG. 11 may include one or more projectors, such as projectors 1102 and 1103 for projecting patterned radiation. Projector(s) 1102/1103 may be configured to project patterned radiation 1101 that may include a multiple spatial symbols. The projector(s) 1102/1103 may emit the patterned radiation over a field of view 1105. The patterned radiation may be projected onto a three-dimensional scene in some cases, which may include one or more objects, such as objects 1107 and 1108. One or more detectors, such as detectors 1109 and 1110, may detect the radiation pattern illuminating the objects. In some embodiments, a detector 1110 may be a camera that may form an image 1111 of the radiation pattern illuminating the scene. A master spatial symbol 1112 may be used to locate 1113 spatial symbols within the formed image 1111. In some embodiments, spatial symbols are located within the formed image by performing a spatial cross-correlation between the master symbol 1112 and the formed image 1111. To decode the information conveyed by the patterned radiation, the located spatial symbols may be identified. Once identified, the angular information that may be conveyed by the spatial symbols may be used to triangulate coordinates of locations on the surface of one or more objects, such as objects 1107 and 1108. In some embodiments, multiple projectors, such as projectors 1102 and 1103, may be configured to project multiple radiation patterns. In some embodiments, each projector, such as projectors 1102 and/or 1103 may be pulsed during a separate camera frame and each frame of the camera may be processed separately. In some embodiments, multiple cameras, such as cameras 1109 and 1110, may be synchronized to each other and to the multiple projectors, such as projectors 1102 and/or 1103, the multiple projectors may be strobed during multiple separate shutter openings of the cameras, and the multiple frames from multiple cameras may be processed separately. System 1100 may be an example of system 1000 of FIG. 10 in some cases.

Figure 12:
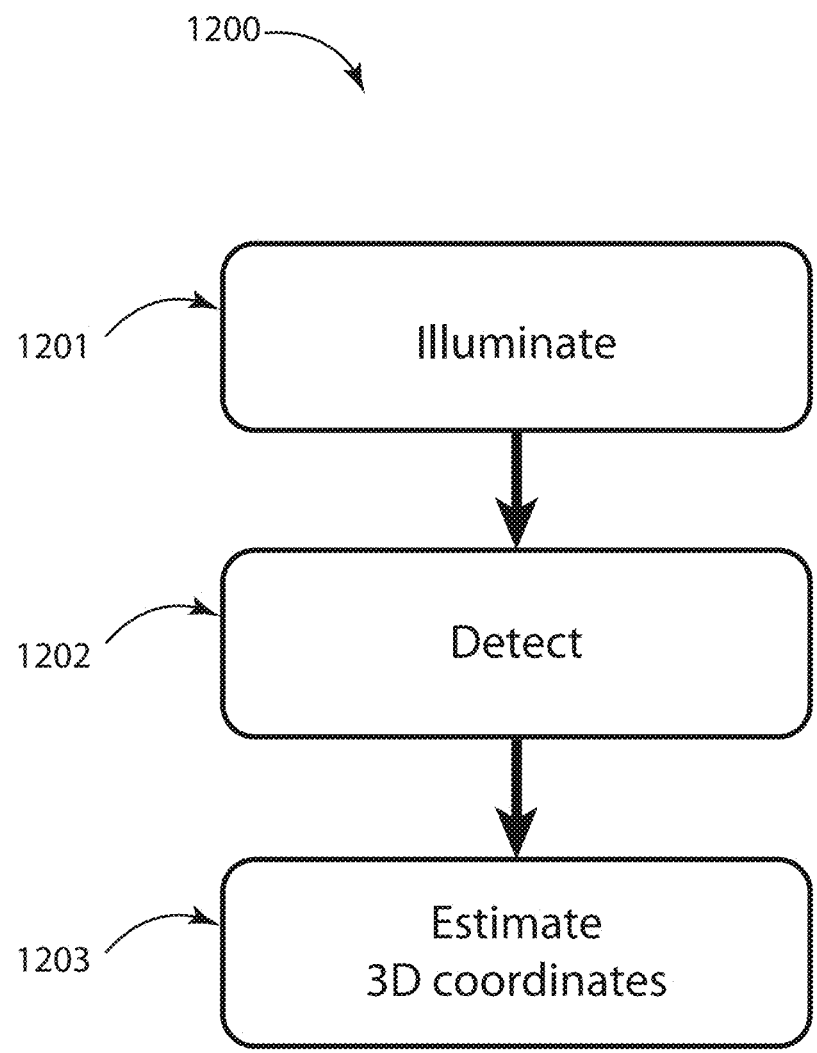
FIG. 12 shows a flow diagram of a method illustrating a process used to produce 3D measurements in accordance with various embodiments.

Turning now to FIG. 12, a flow diagram of a method 1200 for estimating coordinates of a location on an object in a 3D scene is provided in accordance with various embodiments. The method 1200 may be used in conjunction with devices, systems, and other methods described herein. For example, the method 1200 may be used in conjunction with device 100 of FIG. 1A, device 103 of FIG. 1B, device 200 of FIG. 2, and/or device 300 of FIG. 3, and/or systems 1000 of FIG. 10 and/or system 1100 of FIG. 11 for estimating coordinates of a location on an object in a 3D scene, for example. In FIG. 12, the specific selection of blocks shown and the order in which they are shown is intended merely to be illustrative. It is possible for certain blocks to be performed in alternative orders, for certain blocks to be omitted, and for certain additional blocks to be added according to different embodiments. Some but not all of these variants are noted in the description that follows.

At block 1201, a 3D scene may be illuminated with patterned radiation. The patterned radiation may include multiple spatial symbols. At block 1202, the patterned radiation may be detected. In some embodiments, detection of the patterned radiation includes forming an image of the 3D scene illuminated by the patterned radiation. At block 1203, the coordinates of a location on an object within the 3D scene may be estimated using the detected radiation. In some embodiments, estimating coordinates using the detected radiation includes processing the formed image of the 3D scene illuminated by the patterned radiation.

Figure 13:
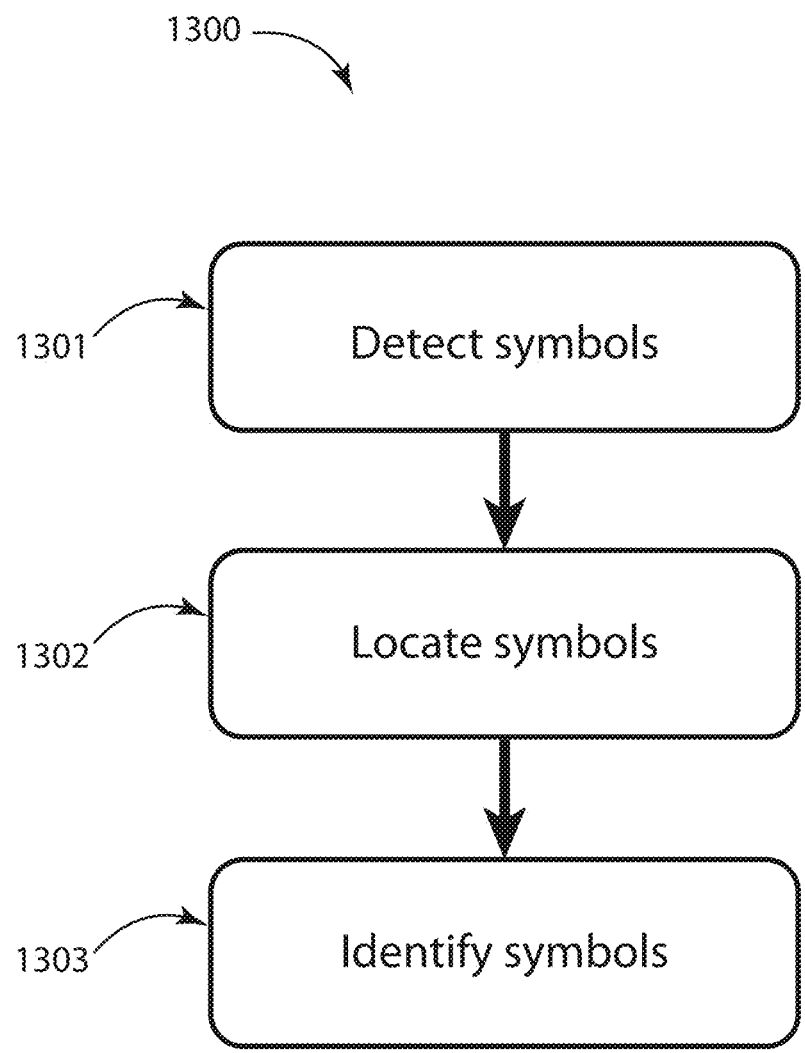
FIG. 13 shows a flow diagram illustrating various embodiments of the symbol processing methods.

The method 1300 illustrated in FIG. 13 may further illustrate embodiments of the relating to the estimation of coordinates of a location on an object in a 3D scene. In some embodiments, the method 1300 may be used in conjunction with method 1200.

The method 1300 may be used in conjunction with devices, systems, and other methods described herein. For example, the method 1300 may be used in conjunction with devices 100, 103, 200, and/or 300, and/or systems 1000 and/or 1100 for estimating coordinates of a location on an object in a 3D scene, for example. In FIG. 13, the specific selection of blocks shown and the order in which they are shown is intended merely to be illustrative. It is possible for certain blocks to be performed in alternative orders, for certain blocks to be omitted, and for certain additional blocks to be added according to different embodiments. Some but not all of these variants are noted in the description that follows.

For example, the patterned radiation used to illuminate as in block 1201 the 3D scene in method 1200 may include multiple spatial symbols. The detection at block 1202 of the patterned radiation may include forming an image of the 3D scene illuminated by the patterned radiation. At block 1301, spatial symbols may be detected within the formed image. At block 1302, the detected spatial symbols may be located within the formed image. At block 1303, the located spatial symbols may be identified. In some embodiments, the spatial symbols may be identified in block 1303 before they are detected in block 1301 and/or located in block 1302. In some embodiments, the spatial symbols may be detected in block 1301 after they may be located in block 1302 and/or identified in block 1303. Method 1300 may be included within method 1200 within block 1203 of estimating the coordinates of a location on an object within the 3D scene using the detected radiation, for example. In some embodiments, the symbols may be detected at block 1301 and/or located at block 1302 using a normalized cross-correlation.

Figure 15:
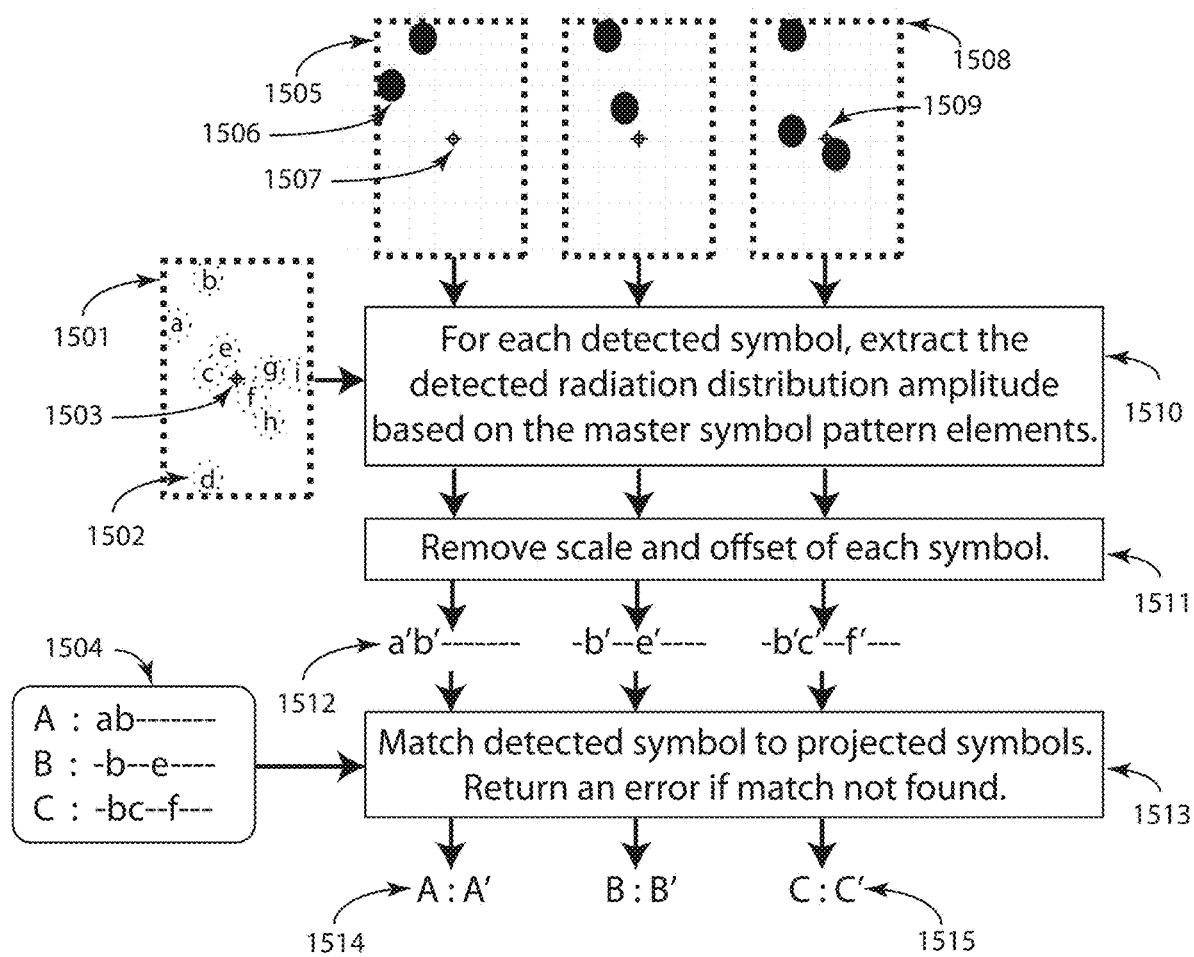
FIG. 15 shows a flow diagram and drawings in accordance with various embodiments of symbol processing methods where detected 2D spatial symbols may be used to produce correspondences between projected symbols and detected symbols.

Symbol identification such as at block 1303 may be based solely on the modulated characteristics of the spatial symbols, as described in the example of FIG. 15, for example, or symbol identification may use additional information. For some 3D measurement systems, it may be possible to repeat spatial symbols across one or more dimensions of the projected pattern. For these systems, some embodiments may identify at block 1303 a spatial symbol using the location of the symbol as additional information. Some embodiments may identify at block 1303 the spatial symbol using the location or identity of adjacent spatial symbols as additional information.

Under some conditions, the method of identifying symbols may use additional techniques in some cases. One such set of conditions may occur when an object with known geometry and/or orientation may be placed into a 3D scene like those illustrated in FIG. 10 and/or FIG. 11. In some embodiments under these conditions, a model of the detected pattern may be formed with a known symbol identification and/or the spatial symbols may be located at block 1302 by calculating deviations between the model and the detected pattern. Another such set of conditions may be described by the case where the detected pattern may not have changed significantly from the previous acquisition. In this case, symbol identities may be retained between frames and only their locations may be changed.

Figure 14:
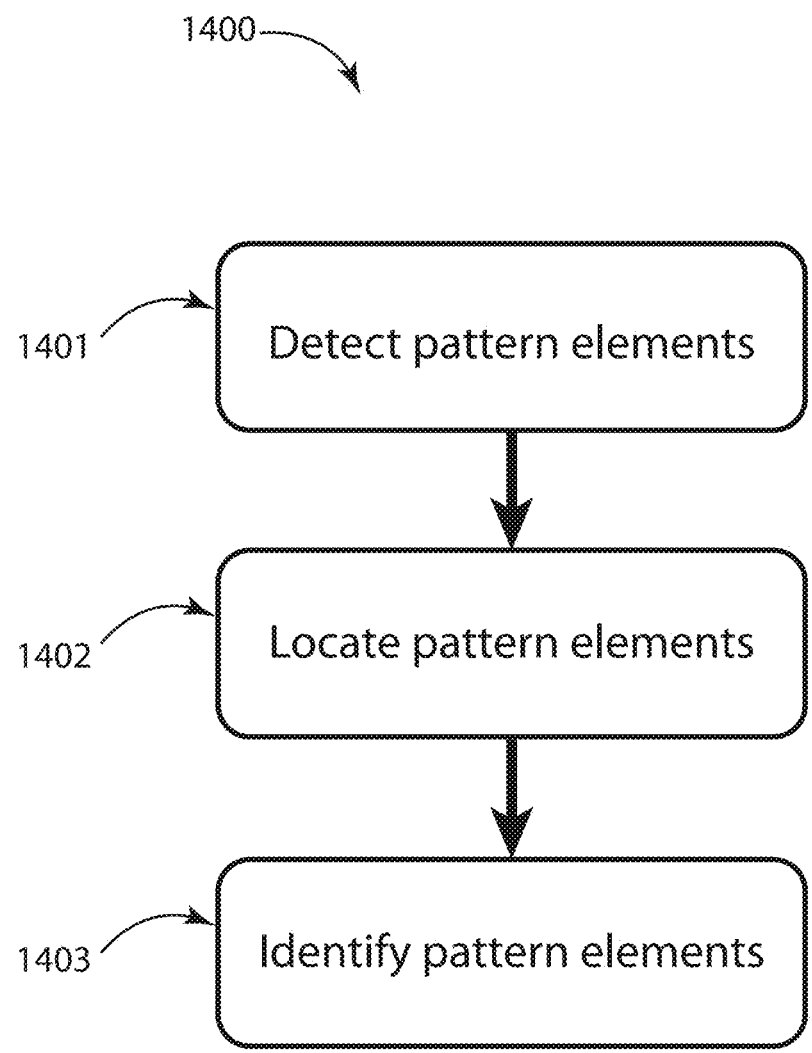
FIG. 14 shows a flow diagram illustrating various embodiments of the pattern element processing methods.

The method 1400 illustrated in FIG. 14 may further illustrate some embodiments of relating to the estimation of coordinates of a location on an object in a 3D scene. In some embodiments, the method 1400 may be used in conjunction with one or both of method 1200 and method 1300. The method 1400 may be used in conjunction with devices, systems, and other methods described herein. For example, the method 1400 may be used in conjunction with devices 100, 103, 200, and/or 300, and/or systems 1000 and/or 1100 for estimating coordinates of a location on an object in a 3D scene, for example. In FIG. 14, the specific selection of blocks shown and the order in which they are shown is intended merely to be illustrative. It is possible for certain blocks to be performed in alternative orders, for certain blocks to be omitted, and for certain additional blocks to be added according to different embodiments. Some but not all of these variants are noted in the description that follows.

For example, the patterned radiation used to illuminate at block 1201 the 3D scene in method 1200 may include multiple spatial symbols, and each spatial symbol may include one or more pattern elements. The detection at block 1202 of the patterned radiation may include forming an image of the 3D scene illuminated by the patterned radiation. At block 1401, pattern elements may be detected within the formed image. At block 1402, the detected pattern elements may be located within the formed image. At block 1403, the located pattern elements may be identified. Method 1400 may be included within method 1200 within block 1203 of estimating the coordinates of a location on an object within the 3D scene using the detected radiation in some cases. In some embodiments, method 1400 may be used in conjunction with method 1300 such that method 1400 follows the method 1300. In other embodiments, method 1300 may be interleaved with method 1400, or each method may occur simultaneously. Some embodiments may include all blocks listed in methods 1200, 1300, and/or 1400, and in other embodiments only a subset of the blocks listed may be performed for any one method, either in conjunction with other methods or on its own.

In general, with respect to methods 1200, 1300, and/or 1400, methods of estimating coordinates of a location on an object in a 3D scene may be provided. The methods 1200, 1300, and/or 1400 may include illuminating at least a portion of the 3D scene with a radiation pattern. The radiation pattern may include multiple spatial symbols. Each spatial symbol may include a radiation distribution such that at least one characteristic of the radiation distribution varies spatially. The multiple spatial symbols may be configured such that each respective spatial symbol of the multiple spatial symbols may be distinguishable from the other spatial symbols of the multiple spatial symbols. In some embodiments, each respective spatial symbol of the multiple spatial symbols may be similar to a master spatial symbol such that: a peak of a normalized spatial cross correlation of the master spatial symbol and each respective spatial symbol exceeds a first predetermined threshold; and/or each side lobe, from multiple side lobes, of the normalized spatial cross correlation of the master spatial symbol and each respective spatial symbol is less than a second predetermined threshold. In some embodiments, the multiple spatial symbols may be configured with respect to the master spatial symbol such that: a normalized spatial cross correlation between the master spatial symbol and the multiple spatial symbols arranged in a spatial arrangement, having a domain of relative offsets between the master spatial symbol and the arrangement of spatial symbols, may be calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a first predetermined threshold; and/or the normalized spatial cross correlation values are less than a second predetermined threshold at all regions of the domain other than the peaks.

The methods 1200, 1300, and/or 1400 may include detecting the radiation pattern illuminating at least the portion of the illuminated 3D scene using one or more radiation detectors. The methods may include estimating the coordinates of the location on the object based on the detected radiation pattern.

In some embodiments of the methods 1200, 1300, and/or 1400, the detected radiation pattern forms an image of the 3D scene. In some embodiments, the one or more radiation detectors include at least a CMOS or a CCD detector array.

In some embodiments the methods 1200, 1300, and/or 1400, estimating the coordinates of the location on the object based on the formed image of the 3D scene includes: detecting one or more spatial symbols from the multiple spatial symbols within the formed image of the 3D scene; locating the one or more detected spatial symbols within the formed image of the 3D scene; and/or identifying one or more of the detected spatial symbols. Some embodiments may further include identifying one or more pattern elements within the identified spatial symbols. In some embodiments, estimating the coordinates of the location on the object utilizes a location of the one or more identified pattern elements within the formed image.

In some embodiments of the methods 1200, 1300, and/or 1400, detecting the one or more spatial symbols includes comparing two or more regions within the formed image to the master spatial symbol. Comparing the two or more regions may include using a cross correlation operation. Some embodiments may further include identifying one or more pattern elements within the identified spatial symbols based on a location of the one or more pattern elements within the identified spatial symbol.

In some embodiments of the methods 1200, 1300, and/or 1400, the radiation pattern further includes one or more additional spatial symbols. In some embodiments, one or more of the multiple spatial symbols is repeated within the radiation pattern.

In some embodiments of the methods 1200, 1300, and/or 1400, the multiple spatial symbols are further configured such that: a normalized spatial cross correlation between the master spatial symbol and the multiple spatial symbols arranged in a spatial arrangement, having a domain of relative offsets between the master spatial symbol and the arrangement of spatial symbols, is calculated to produce a normalized spatial cross correlation value for each point in the domain; values of the normalized spatial cross correlation form peaks at regions in the domain representing zero relative offset between the master spatial symbol and each of the spatial symbols in the spatial arrangement exceeds a third predetermined threshold; and/or the normalized spatial cross correlation values are less than a fourth predetermined threshold at all regions of the domain other than the peaks. In some embodiments, each respective spatial symbol of the multiple spatial symbols may be further configured to be similar to a master spatial symbol such that: a peak of a normalized spatial cross correlation of the master spatial symbol and each respective spatial symbol exceeds a third predetermined threshold; and/or each side lobe, from multiple side lobes, of the normalized spatial cross correlation of the master spatial symbol and each respective spatial symbol is less than a forth predetermined threshold.

Previously, in reference to FIGS. 8 and 9, it was described how a spatial cross-correlation operation between a master spatial symbol and an arrangement of spatial symbols may be used to detect and located spatial symbols. Detection and location of symbols may be two blocks of method 1300. Reference is now made to FIG. 15 to describe some embodiments of a method for spatial symbol identification. The method may be utilized in conjunction with device 100 of FIG. 1A, device 103 of FIG. 1B, device 200 of FIG. 2, device 300 of FIG. 3, system 1000 of FIG. 10, and/or system 1100 of FIG. 11. FIG. 15 may depict three spatial symbols, including exemplary spatial symbols 1505 and 1508. The symbols may belong to a symbol set based upon a master symbol according to the method for the formation of spatial symbols based on a master spatial symbol described in the context of FIG. 5. The identity of spatial symbols within the set may be distinguishable from one another based on the characteristics of one spatial symbol relative to the other spatial symbols within the spatial symbol set. The systems and/or methods described in FIG. 10 and FIG. 11, as examples, may use the identity of a detected spatial symbol to produce a correspondence between the angle of a projected spatial symbol and the angle at which the spatial symbol is detected. An embodiment of a method that identifies symbols and forms correspondences based on modulation values may be illustrated in FIG. 15. As an example, FIG. 15 may show a case where three spatial symbols with binary amplitude-modulated pattern elements may have been detected and may be identified. The detected symbols, such as symbols 1505 and 1508, may include binary amplitude-modulated pattern elements, such as element 1506. In this example, pattern elements may be depicted as dots, and two spatial symbols may be illustrated with two pattern elements and one spatial symbol may be illustrated with three pattern elements. In some embodiments, the spatial symbols may include pattern elements other than dots; the spatial symbols may contain more or less than three pattern elements, and/or may contain the same or different numbers of pattern elements within each spatial symbol.

In some embodiments of a spatial symbol identification method, the location of each spatial symbol, such as symbol 1507 and 1509, may be passed to the symbol identification process using, merely by way of an example, the analysis of a cross-correlation result. When such spatial symbol locations may be available, the identification method may be applied, in some cases, to only a subset of the detected spatial symbols that have been detected and located. The location of each spatial symbol may serve as an origin 1507 of a coordinate system for locating pattern elements within the spatial symbol. The master spatial symbol 1501 may provide a map of the relative position, identity, and/or location of pattern elements, for example, within each spatial symbol. In the illustrated embodiment, the master spatial symbol 1501 may include information on the pattern elements labeled a through i. The master spatial symbol 1501 itself may have an origin 1503 of a coordinate system for locating pattern elements within the master spatial symbol. In the illustrated embodiment, the identification method may examine and/or extract 1510 the relevant detected spatial symbol characteristic distributions based on the relative position values described within the master spatial symbol. In some embodiments where the symbol locations such as symbols 1507 and 1509 are known, the method may examine and/or extract pattern elements based on the relative positions of the pattern elements from the origin 1503 of the master spatial symbol coordinate system. In some embodiments, the scale and/or offset of each symbol may be removed 1511 to produce a vector of detected modulation values 1512. Removal of scale and/or offset may be important for practical depth imaging systems in order to account for variable reflectivity and ambient lighting conditions. The vector of detected modulation values 1512 may indicate which pattern elements may have been detected in the spatial symbol. For example, the spatial symbol 1505 may yield a detected modulation vector that may indicate pattern elements a' and b' have been detected. To identify the symbol, this vector of detected modulated values 1512 may be compared to a library 1504 containing all vectors of modulated values within the set of spatial symbols. In the illustrated embodiment, the pattern library may contain three symbols, labeled A, B, and C. Some embodiments of the library may contain a larger number of symbols, such as twenty symbols, merely by way of example. In some embodiments, the library may contain fewer symbol labels than vectors of modulated values, where multiple vectors of modulated values may map to a single symbol. A matching process 1513 may return the best match between the vector of detected modulated values and the vectors contained in the library. In an embodiment using binary amplitude modulation and nine pattern elements, for example, the vector of detected modulated values may be mapped to a nine-bit binary number, and the best match may be the nine-bit binary number within the library that is equal to said number. In other embodiments of amplitude modulation, the matching process may find the library value which represents the closest element in a multi-dimensional code space, for example using a Hamming distance or a Euclidean distance as a metric of closeness. In embodiments based on other modulations, the vector of modulated values may represent other characteristics of the pattern elements; merely as an example, a frequency modulated system may indicate the frequency offset of each pattern element as a number and build the vector of modulated values from these numbers. The output of the identification process may indicate the detected spatial symbol identity, the projected spatial symbol identity, and/or a correspondence consisting of both. In the illustrated embodiment, the matching process may return a correspondence 1514 including the projected symbol identity followed by the detected symbol identity. In some cases, noise, systematic errors, and/or other effects may exist that may cause symbol identification errors. Errors may be detected when the vector of detected modulated values 1512 may have no match in the library 1504, for example. In some embodiment, the matching process may be configured to return an error 1513 when no acceptable match may be found. In some embodiments, the matching process may be configured to provide a figure of merit that may describe the quality of the match.

Figure 16:
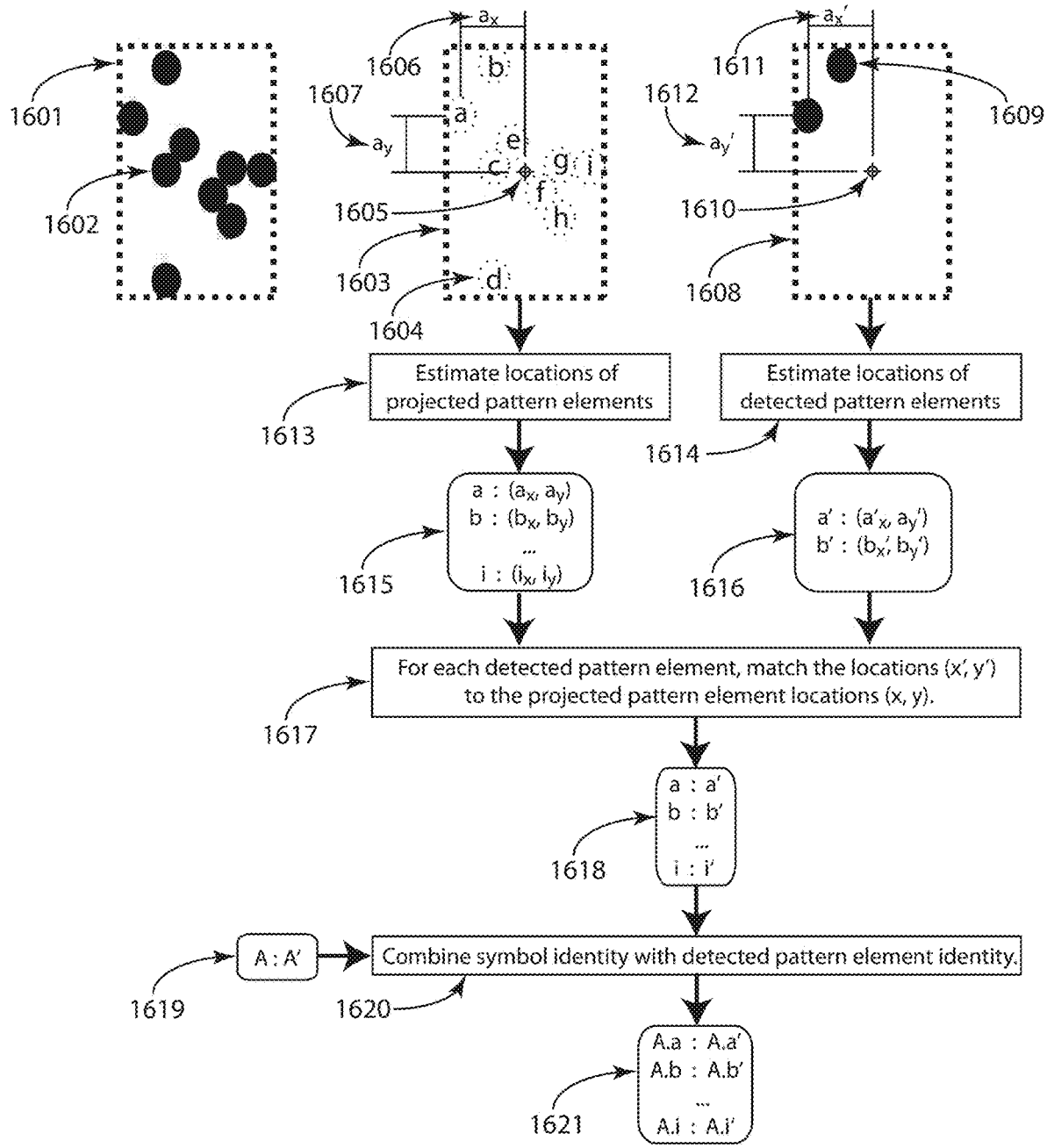
FIG. 16 shows a flow diagram and drawings in accordance with various embodiments of a pattern element processing methods where a detected 2D spatial symbol may be used to produce correspondences between projected pattern elements and detected pattern elements.

FIG. 16 provides aspects related to methods for detecting, locating, and/or identifying pattern elements within spatial symbols in accordance to various embodiments. The embodiments described here in reference to FIG. 16 may be examples of the method for detecting, locating, and/or identifying pattern elements described in reference to FIG. 14, for example. The method may be utilized in conjunction with device 100 of FIG. 1A, device 103 of FIG. 1B, device 200 of FIG. 2, device 300 of FIG. 3, system 1000 of FIG. 10, and/or system 1100 of FIG. 11. The method of FIG. 16 may be used to detect, locate, and/or identify pattern elements in a detected radiation pattern, such as a formed image of a scene illuminated with patterned radiation, where the radiation pattern may include a multiple distinguishable spatial symbols, where each spatial symbol may bear a similarity to a master spatial symbol. For clarity, the method may be described in the context of a single detected spatial symbol 1608, which may include pattern elements 1609. The distribution of pattern elements with the spatial symbol 1608 may be based on the layout of pattern elements in a master spatial symbol 1601. The locations of the pattern elements in the master spatial symbol may describe the locations at which pattern elements may have been projected within the detected spatial symbol. By matching the projected locations and/or detected locations of pattern elements, correspondence may be established that may be used to triangulate the coordinates of points upon which the pattern elements may have been projected. In some embodiments, such pattern element correspondences may enable independent coordinate measurements at every location within a scene that is illuminated by a pattern element.

In FIG. 16, the locations of the pattern elements 1602 within the master spatial symbol may be specified by coordinates 1606, 1607 relative to an origin 1605 of a coordinate system local to the master spatial symbol. For example, the illustrated master spatial symbol may include nine pattern elements labeled a through i, and the coordinates of pattern element a are (ax,ay). In some embodiments, the locations of the projected pattern elements may be known based on the design of the master symbol and knowledge of the projection device. In other embodiments, the locations of the projected pattern elements for one or more spatial symbols may be measured using a calibration procedure, or they may be estimated 1613 from measurements of the projected radiation pattern using the master spatial symbol 1603 as a model. Once the locations of the projected pattern elements within the coordinate system of the master spatial symbol may have been determined, they may be stored along with the identity of each pattern element 1615. These locations may now provide a map for locating pattern elements within a detected spatial symbol 1609. In some embodiments, the projected pattern element locations 1615 may be stored in a look-up-table (LUT), which may enable quick access of the values by the triangulation algorithms. Once a spatial symbol may have been detected and/or located within a radiation pattern, for example using a cross-correlation operation between the master spatial symbol and the detected radiation pattern, its location and the location of an origin 1610 of a coordinate system local to the spatial symbol may be known. In some embodiments, the pattern element locations 1615 that may be prescribed by the master spatial symbol may be searched directly for the existence of pattern elements within the detected spatial symbols. In other embodiments, the location of each pattern element within each spatial symbol may be estimated 1614 from direct measurements of the radiation pattern using, for example, a peak detection algorithm. Once the symbol elements may have been located within the spatial symbol, their locations may be associated with a label 1616. In FIG. 16, for example, two pattern elements may be detected, labeled a' and b'. To establish correspondences 1618, the projected pattern element locations 1615 may be matched 1617 to the detected pattern element 1616. The matching process may compare the relative locations of the detected and projected pattern elements relative to a coordinate system local to the spatial symbol. For example, if the locations (ax',ay') and (ax,ay) may match to within a tolerance, a correspondence may be established between the detected pattern element a' and the projected pattern element a. In some embodiments, an operation such as scaling, rotation, warping, and/or some other operation may be applied to the detected pattern element locations before comparing to the projected pattern element locations. It may be noted that location may merely be one example of a means for matching detected pattern elements to projected pattern elements, and/or other means may be used. For example, pattern element shapes, colors, amplitudes, and/or some other characteristic may be used for matching. Once a correspondence may have been established between detected and projected pattern elements, the information that may be conveyed by the spatial symbol identity 1619 may be used to map the identified pattern elements to projected angles that may be used for triangulation. For example, in some embodiments, the angular coordinates (azimuth and/or elevation) of each pattern element within a radiation pattern may be known relative to a point in space, such as the intersection of an optical axis and/or a principal plane of the device projecting the radiation pattern. Each pattern element may be identified by a spatial symbol identity, such as A, and a pattern element identity, such as a. Thus, the pattern element A.a may uniquely identify a set of projection angles. By detecting, locating, and/or identifying the spatial symbol A, and within it, detecting, locating, and/or identifying the pattern element a, one or more projection angles may be identified. This identified projection angle may then be used to triangulate the coordinates of a point on an object illuminated by the pattern element a.

Figure 17:
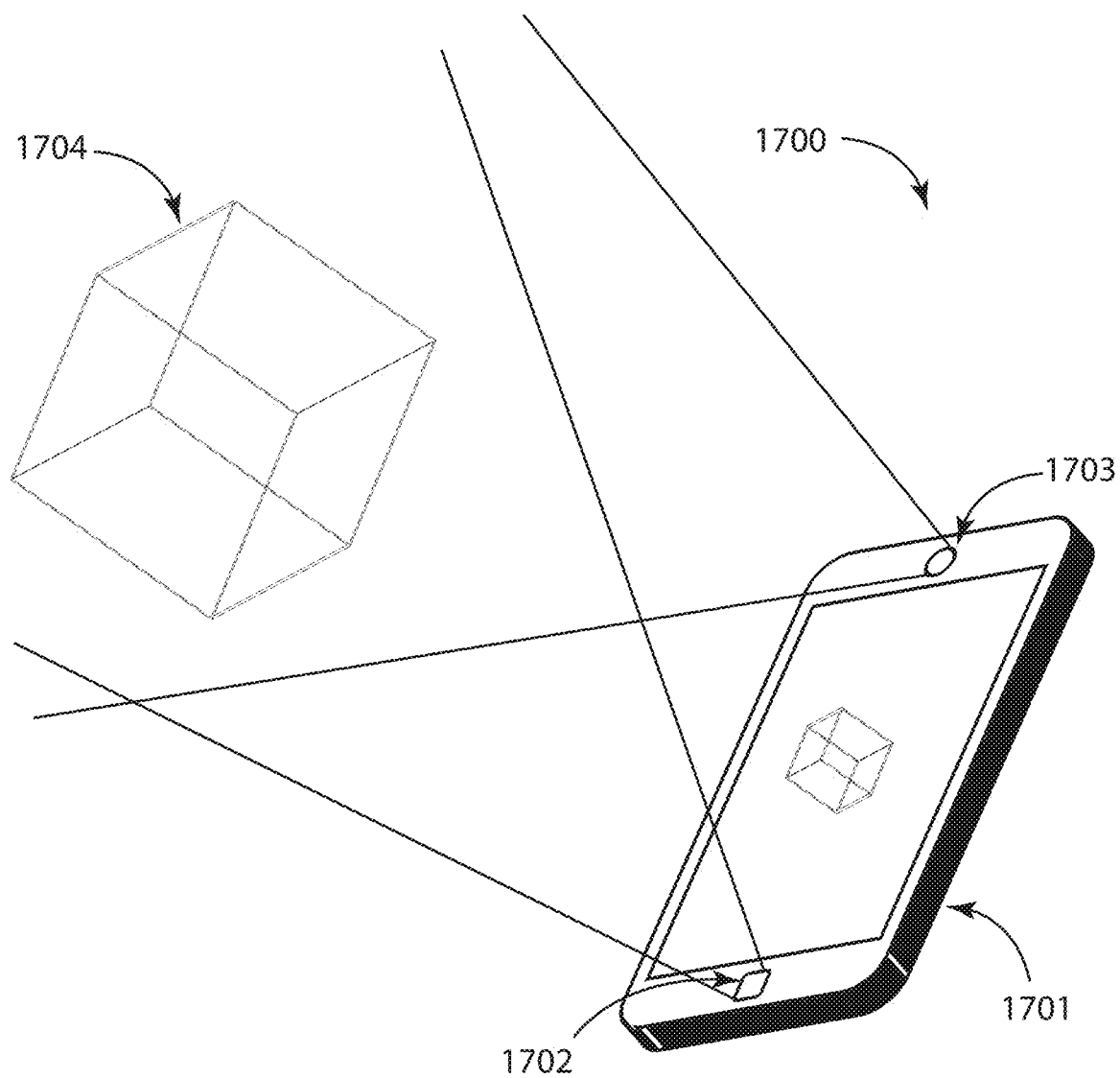
FIG. 17 shows a drawing to illustrate various embodiments may be embedded in a mobile device, such as a mobile phone.

FIG. 17 illustrates a system 1700 for estimating the coordinates of a location on an object 1704 in a 3D scene in accordance with various embodiments. System 1700 may be an example of system 1000 of FIG. 10 and/or system 1100 of FIG. 11, for example. System 1700 may utilize aspects of device 100 of FIG. 1A, device 103 of FIG. 1B, device 200 of FIG. 2, and/or device 300 of FIG. 3. The system 1700 may include, or be embedded in, a mobile electronic device 1701, for example, though the system 1700 may be included and/or embedded in other devices. Examples of such a mobile electronic device include, but are not limited to, a mobile telephone, a smartphone, a tablet computer, a laptop computer, and/or another mobile electronic device. The system 1700 may include a device 1702 for projecting patterned radiation, which may include a pattern-generating element configured to produce a radiation pattern, where the radiation pattern may include a multiple spatial symbols, and where each spatial symbol may include a radiation distribution such that at least one characteristic of the radiation distribution varies spatially. Device 1702 may be an example of device 100 of FIG. 1A, device 103 of FIG. 1B, device 200 of FIG. 2, and/or device 300 of FIG. 3, merely by way of example. The system 1700 may also include one or more detectors 1703 that may be configured to detect the radiation pattern illuminating at least a portion of the 3D scene. In some embodiments, the one or more detectors 1703 may be a digital camera. The system 1700 may also include one or more processors (not shown) that may be configured to estimate the coordinates of the location on the object in the 3D scene based on the detected radiation pattern. In some embodiments, the one or more processors may be one or more processors present in the mobile electronic device 1701. In other embodiments, the processor may be an application-specific integrated circuit (ASIC), a field-programmable gate array (FPGA), a digital signal processor (DSP) chip, a central processing unit (CPU), a graphics processing unit (GPU), another type of processor, and/or various combinations of processor types. In some embodiments, the one or more processors may be dedicated to coordinate estimation, whereas in other embodiments the one or more processors may perform other tasks as well. In some cases, the one or more processors may process the resulting coordinate data for purposes such as object detection, object identification, object inspection, object scanning, gesture recognition, facial recognition, tracking, targeting, locating, and/or other purposes. In some embodiments, one or more of the device 1702 for projecting patterned radiation, the one or more detectors 1703, and/or the one or more processors may not be embedded in a mobile electronic device, while the other such components are embedded in the mobile electronic device. An example of such an embodiment may include a system that may transmit the detected radiation pattern data to a remote processor, which may perform the coordinate estimation. In some embodiments, the system 1700 may be integrated with a display system, such as a television, a computer monitor, a virtual reality headset, a heads-up display, a set of smart glasses, a public information console, a tradeshow station, and/or an embedded inter-ocular display.

While detailed descriptions of one or more embodiments have been given above, various alternatives, modifications, and equivalents will be apparent to those skilled in the art without varying from the spirit of the different embodiments. Moreover, except where clearly inappropriate or otherwise expressly noted, it should be assumed that the features, devices, and/or components of different embodiments may be substituted and/or combined. Thus, the above description should not be taken as limiting the scope of the different embodiments, which may be defined by the appended claims.

What is claimed is:

1. A device for projecting patterned radiation, comprising:
one or more pattern-generating elements configured to produce a radiation pattern, wherein the radiation pattern includes:
a plurality of spatial symbols, wherein each spatial symbol from the plurality of spatial symbols comprises a radiation distribution such that at least one characteristic of the radiation distribution varies spatially and wherein the plurality of spatial symbols are configured such that:
each respective spatial symbol from the plurality of spatial symbols is distinguishable from the other spatial symbols from the plurality of spatial symbols; and
each respective spatial symbol from the plurality of spatial symbols is related to one or more master spatial symbols.

2. The device for projecting patterned radiation of claim 1, wherein the plurality of spatial symbols includes a plurality of arrangements of the plurality of spatial symbols.

3. The device for projecting patterned radiation of claim 2, wherein the plurality of arrangements of the plurality of spatial symbols includes a first arrangement of the plurality of spatial symbols and a second arrangement of the plurality of spatial symbols.

4. The device for projecting patterned radiation of claim 3, wherein the second arrangement of the plurality of spatial symbols is a repetition of the first arrangement of the plurality of spatial symbols.

5. The device for projecting patterned radiation of claim 4, wherein the second arrangement of the plurality of spatial symbols is arranged along a first direction with respect to the first arrangement of the plurality of spatial symbols along a first linear dimension.

6. The device for projecting patterned radiation of claim 5, wherein the second arrangement of the plurality of spatial symbols is arranged along a second direction with respect to the first arrangement of the plurality of spatial symbols.

7. The device for projecting patterned radiation of claim 3, wherein the second arrangement of the plurality of spatial symbols is a repetition of the first arrangement of the plurality of spatial symbols with a shift applied to the plurality of spatial symbols of the first arrangement of the plurality of spatial symbols to form the second arrangement of the plurality of symbols.

8. The device for projecting patterned radiation of claim 7, wherein the shift applied to the plurality of spatial symbols of the first arrangement of the plurality of spatial symbols to form the second arrangement of the plurality of symbols is performed on a row-to-row basis.

9. The device for projecting patterned radiation of claim 7, wherein the shift applied to the plurality of spatial symbols of the first arrangement of the plurality of spatial symbols to form the second arrangement of the plurality of symbols is less than a symbol width.

10. The device for projecting patterned radiation of claim 3, wherein the second arrangement of the plurality of spatial symbols includes the same symbols from the first arrangement of the plurality of spatial symbols in a different order from the first arrangement of the plurality of spatial symbols.

11. The device for projecting patterned radiation of claim 1, wherein the plurality of spatial symbols includes one or more spatial symbols from the plurality of spatial symbols that is repeated.

12. The device for projecting patterned radiation of claim 1, wherein the plurality of spatial symbols includes one or more spatial symbols from the plurality of spatial symbols that is rotated.

13. The device for projecting patterned radiation of claim 1, wherein the plurality of spatial symbols includes one or more spatial symbols from the plurality of spatial symbols that is distorted.

14. The device for projecting patterned radiation of claim 1, wherein the plurality of spatial symbols includes two or more spatial symbols from the plurality of spatial symbols that are arranged to overlap each other.

15. The device for projecting patterned radiation of claim 1, wherein the pattern-generating element is configured to produce one or more distorted spatial symbols from the plurality of spatial symbols to compensate for distortion introduced through a projection lens.

16. The device for projecting patterned radiation of claim 1, wherein the one or more master symbols includes a plurality of master symbols.

17. The device for projecting patterned radiation of claim 1, wherein one or more pattern-generating elements includes a plurality of pattern generating elements configured as a plurality of projectors.

18. The device for projecting patterned radiation of claim 17, wherein the plurality of projectors are configured to be at least pulsed or strobed.

* * * * *